United States Patent [19]
Katata et al.

[11] Patent Number: 5,327,502
[45] Date of Patent: Jul. 5, 1994

[54] IMAGE CODING SYSTEM USING AN ORTHOGONAL TRANSFORM AND BIT ALLOCATION METHOD SUITABLE THEREFOR

[75] Inventors: Hiroyuki Katata; Yoji Noguchi; Hiroshi Akagi, all of Nara, Japan

[73] Assignee: Sharp Kabushiki Kaisha, Osaka, Japan

[21] Appl. No.: 821,221

[22] Filed: Jan. 16, 1992

[30] Foreign Application Priority Data

| Jan. 17, 1991 | [JP] | Japan | 3-003943 |
| May 23, 1991 | [JP] | Japan | 3-118825 |
| May 23, 1991 | [JP] | Japan | 3-118826 |
| Jun. 18, 1991 | [JP] | Japan | 3-146217 |

[51] Int. Cl.$^5$ .............................................. G06K 9/36
[52] U.S. Cl. ..................................... 382/56; 382/41; 358/433
[58] Field of Search ................ 382/56, 51, 50, 41; 358/133, 432, 433; H04N 7/12; G06K 9/36, 9/46, 9/38

[56] References Cited

U.S. PATENT DOCUMENTS

| 4,184,049 | 1/1980 | Crochiere et al. | 179/1 SA |
| 4,516,258 | 5/1985 | Ching et al. | 381/31 |
| 5,021,891 | 6/1991 | Lee | 382/41 |
| 5,109,451 | 4/1992 | Aono et al. | 358/133 |

FOREIGN PATENT DOCUMENTS

| 0267579 | 5/1988 | European Pat. Off. . |
| 0339589 | 2/1989 | European Pat. Off. . |
| 2541315 | 4/1976 | Fed. Rep. of Germany . |
| 55-57900 | 4/1980 | Japan . |
| 63-111781 | 5/1988 | Japan . |

OTHER PUBLICATIONS

Communication from the European Patent Office dated Jun. 21, 1993.
H. Hashimoto "Image Data Coding Algorithm II—Transform Coding—", Journal of the Institute of Television Engineers of Japan, vol. 43, No. 10, 1989.
W. Chen, C. Harrison Smith, "Adaptive Coding of Monochrone and Color Images", IEEE Transaction on Communications vol. Com. 25, No. 11 Nov. 1977.
A. Rosenfeld and A. C. Kak: "Digital Picture Processing", Academic Press Inc., 2nd Edition, 1989, pp. 116-165.

*Primary Examiner*—Jon J. Couso
*Attorney, Agent, or Firm*—David G. Conlin; Henry D. Pahl, Jr.

[57] ABSTRACT

A bit allocation method which facilitate control of the number of bits to be assigned to transform coefficients and block of image data with a deviation from the functional form. An image coding system which can implement an optimal bit allocation that minimizes quantization error under a predetermined information content or amount, in carrying out bit allocations of block-adaptive type and transform coefficient-adaptive type.

2 Claims, 17 Drawing Sheets

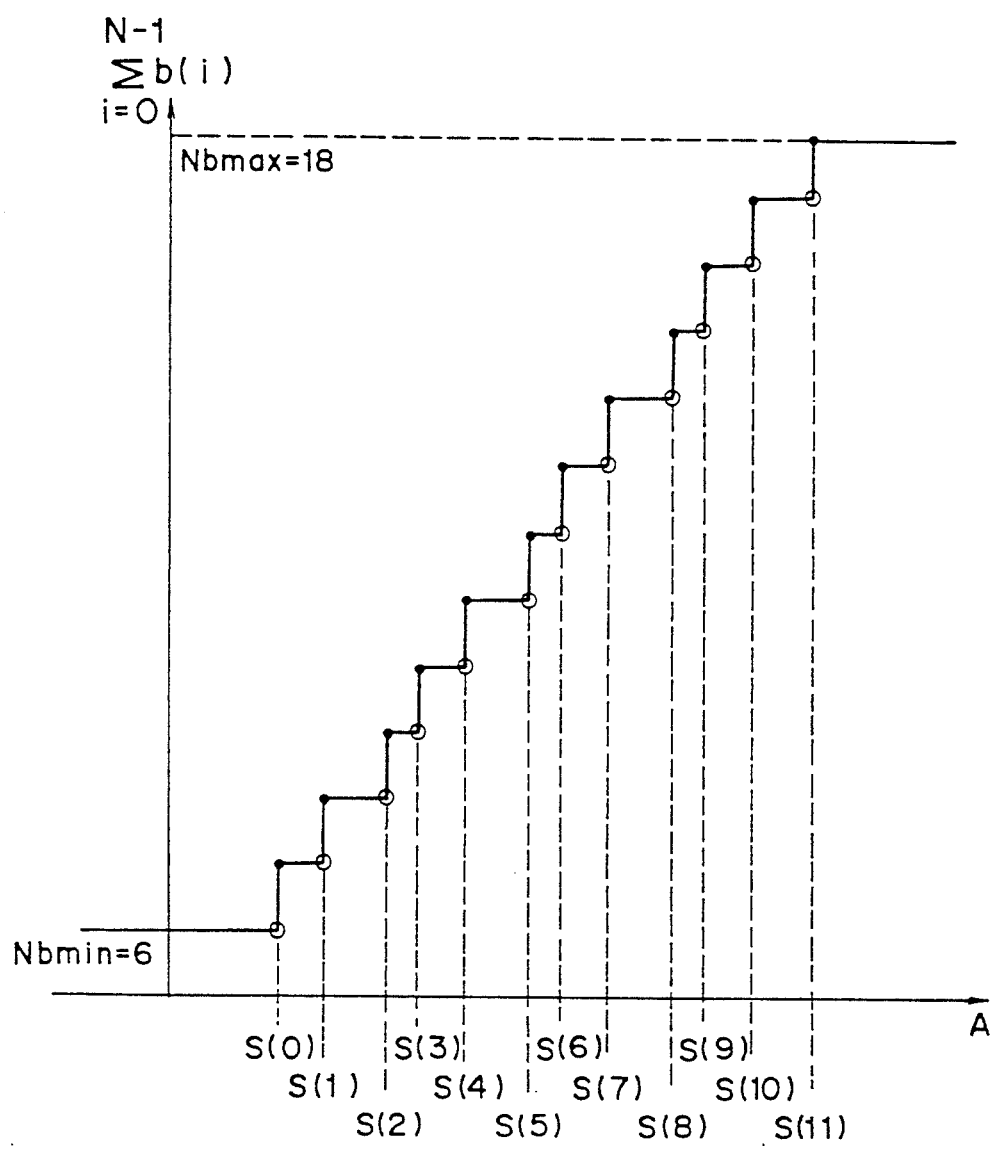

IMAGE CODING SYSTEM USING AN ORTHOGONAL TRANSFORM AND BIT ALLOCATION METHOD SUITABLE THEREFOR

BACKGROUND OF THE INVENTION

1. Field of the Invention

The present invention relates to an image coding system and method used in receiving and transmitting image data through a transmission medium, and further relates to a bit allocation method suitable for use in the orthogonal transform coding of motion picture data and audio data.

2. Description of the Prior Art

In order to hold the transmission rate of image data constant, a feedback method has been conventionally practiced. In this method, after image data is quantized in a specified quantization step, its information content is calculated, and the data is requantized with the quantization step changed so that the information content will become a target value. This method, however, meets difficulties in controlling the information content accurately for motion pictures that require real-time processing. Thus, the method is not suitable especially for equipment related to package media such as digital VTR's (Video Tape Recorders).

Under the above circumstances, coding methods of feed-forward type have been proposed which can relatively easily make the information content of image data within a certain range constant. Examples of the methods include those using an ADRC (Adaptive Dynamic Range Coding) method, a transform coding, or the like. The ADRC method is a block adaptive coding method in which an image is divided into blocks and the average number of bits is adaptively assigned to each block with the bit rate constant by the dynamic range of each block. On the other hand, a coefficient-adaptive coding method is generally known as the method using a transform coding, in which bit distribution is determined for each of transform coefficients resulting from an orthogonal transform of image data so that the bit rate is made constant and the quantization error is minimized relative to the transform coefficients.

However, owing to use of dynamic ranges of blocks as described above, the ADRC method is lower in accuracy of bit allocation to each block than when some statistic such as variance is used, and moreover it does not involve the optimum bit allocation relative to the transform coefficients within a block. On the other hand, the method using the transform coding, although implementing an adaptive bit allocation relative to the transform coefficients, is given no consideration to the bit allocation for each block. In consequence, it cannot be said that the optimum bit allocation is always ensured in either case of the above methods. For example, a publication, "Digital Picture Processing," by A. Rosenfeld and A. C. Kak, Academic Press Inc., 2nd edition, 1982, pp. 116–165, introduces a method of bit allocation using the following formula (1):

$$b(i) = bavr + \left[ \ln(\sigma(i)^2) - \sum_{i=0}^{N-1} \ln(\sigma(i)^2)/N \right]/a \quad (1)$$

$(i = 0, 1, \ldots, N-1)$ where $b(i)$ is the number of bits assigned to the ith transform coefficient, $\sigma(i)^2$ is a variance of the ith transform coefficient, and bavr is the average number of bits. N is the total number of transform coefficients; for example, if the transform is a one-dimensional 8-point transform, then $N=8$, and if it is a two-dimensional 4-point by 4-point transform, then $N=4^2=16$. And a is a parameter contained in the following formula that represents a quantization error D:

$$D \propto \sum_{i=0}^{N-1} \exp(-a \cdot b(i))$$

The above formula (1) can be obtained as to minimize D subject to the following constraint:

$$\sum_{i=0}^{N-1} b(i) = N \cdot bavr$$

As described above, the functional form of $b(i)$ is $\ln\sigma(i)^2 + \text{const}$. It is to be noted that $$\sum_{i=0}^{N-1} b(i)$$

is represented hereinafter simply as $\Sigma b(i)$.

In the actual bit allocation, there is a restriction such as, for example, "$b(i)$ is an integer within a certain range" as follows:

$$b(i) \in \{b_{min}, b_{min}+1, \ldots, b_{max}-1, b_{max}\} \quad (2)$$

($b_{min}$ and $b_{max}$ are integers)

For this reason, it has conventionally been practiced that after determining the $b(i)$ in real-number calculation using the formula (1), bit allocation is made in a manner as shown below (see Japanese Patent Laid-Open Publication No. 55-57900, 1980), assuming that $b_{min}=0$ and $b_{max}=5$:

(i) $b(i)$ is calculated by the formula (1).

(ii-1) When there is an i satisfying $b(i) < -0.5$, $$\begin{aligned} b1(i) &= 0 & \text{for } b(i) < -0.5 \\ &= b(i) - d1 & \text{elsewhere} \end{aligned}$$

where d1 is determined so as to satisfy $\Sigma b1(i) = N \cdot bavr$.

(ii-2) When there is no i satisfying $b(i) < -0.5$, $$b1(i) = b(i)$$

(iii-1) When there is an i satisfying $b(i) \geq 5.5$, $$\begin{aligned} b2(i) &= 5 & \text{for } b(i) \geq 5.5 \\ &= b1(i) + d2 & \text{elsewhere} \end{aligned}$$

where d2 is determined so as to satisfy $\Sigma b2(i) = N \cdot bavr$.

(iii-2) When there is no i satisfying $b(i) \geq 5.5$, $$b2(i) = b1(i)$$

(iv) $b2(i)$ is rounded into an integer, $bI(i)$. In addition, an $e(i)$ satisfying the following equation is determined: $e(i) = |bI(i) - b2(i)|$.

(v) When $\Sigma bI(i) < N \cdot bavr$, an i that minimizes the $e(i)$ is assumed to be $i_{min}$, with additional assumptions:

$$bI(i_{min}) = bI(i_{min}) = 1$$

$$e(i_{min}) = |bI_{,}(i_{min}) - b2(i_{min})|$$

On the other hand, when $\Sigma bI(i) > N*bavr$, an i that maximizes the rounding error e(i) is assumed to be $i_{max}$, with additional assumptions:

$$bI(i_{max}) = bI(i_{max}) - 1$$

$$e(i_{max}) = |bI(i_{max}) - b2(i_{max})|$$

(vi) The operation of step (v) is repeated until $\Sigma bI(i) = N*bavr$.

In the above conventional method, there is a possibility that a bit allocation not satisfying the restriction of the above formula (2) be given. For instance, assume that if N=5 and N*bavr=16, then b(i)={−0.40, 0.10, 0.90, 5.40, 10.00} after step (i) is processed. In this case, since there is no value smaller than −0.50, b(i) is assumed to be b1(i) in step (ii-2). In step (iii-1), after the value 10 is set to 5, d2=1.25 is added to the other values so that the total sum becomes 16. As a result, $$b2(i) = \{0.85, 1.35, 2.15, 6.65, 5.00\}$$

which in step (iv) leads to:

$$bI(i) = \{1, 1, 2, 7, 5\}$$
$$\Sigma bI(i) = 16$$

Consequently, this serves as the bit allocation to be found, whereas bI(3)=7 is larger than 5, inconsistent with the above-mentioned restriction.

To avoid such an inconsistency, it is necessary to check, when the last bit allocation is completed, if all bit allocations are desirable, and then to correct undesirable bit allocations in some way, if any.

There is another possibility, when the above step (v) is effected, that a b(i) which, in step (i), has satisfied the condition below may be such that its functional form is deviated from $\ln\sigma(i)^2 + const.$ $$b(i) \in [b_{min}, b_{max}]$$

SUMMARY OF THE INVENTION

An object of the present invention is therefore to provide a bit allocation method which facilitates the control of the number of bits to be assigned to transform coefficients and blocks of image data with a minimum deviation from the functional form of the above formula (1).

Another object of the present invention is to provide an image coding system which can implement an optimum bit allocation that minimizes the quantization error under a predetermined information content or amount, in carrying out bit allocations of block-adaptive type and transform coefficient-adaptive type.

A further object of the present invention is to provide an image coding system which can accurately control the total information amount to a constant level with simple hardware and which can also assign proper information contents to images.

A still further object of the present invention is to provide a high-efficiency image coding system which involves an extremely small amount of distortion of images.

In order to achieve the aforementioned first object, according to an embodiment of the present invention, the above-mentioned formula (1) is transformed as follows:

$$\left. \begin{array}{l} f(i) = A + g(i) \\ g(i) = \ln(\sigma(i))^2/a \\ A = bavr - \Sigma\{(\ln\sigma(i)^2)/N/a\} \end{array} \right\} \quad (3)$$

where f(i) is a bit allocation before the restriction of the above formula (2) is added, and the bit allocation after the restriction is added is determined by the following formula:

$$b(i) = Q(f(i)) \quad (4)$$

where Q(x) is the result of rounding x according to a graph of FIG. 2 showing the relationship between the input and the corresponding output rounded into an integer. According to the formulas (3) and (4), when g(i) is given, b(i) is expressed as a function of A.

This aspect is shown in FIG. 3, where $b_{min}=2$, $b_{max}=6$, g(i)=4.7. As a result, the total number of bits $\Sigma b(i)$ is also a function of A, as shown in FIG. 4 which is a graph showing the relationship between the variable A and the total number of bits $\Sigma b(i)$, wherein N=3.

From a graph exemplified by FIG. 4, A is selected so that the total number of bits becomes less than N*bavr, and then bit allocation is effected according to the formulas (3) and (4), where bavr denotes the average number of bits resulting from an actual bit allocation (i.e., bit allocation with the restriction of the formula (2)).

As described above, since the total number of bits is represented as a function of A, the number of bits can be easily controlled by changing the value of A. After determining the value of A, the only thing to do is to determine the b(i) according to the formulas (3) and (4). Thus, the functional form, $\ln\sigma(i)^2 + const.$, can be maintained within the range of $[b_{min}, b_{max}]$.

In order to achieve the second object, an image coding system according to an embodiment of the present invention has:

means for dividing one-screen image data of an original image into a plurality of blocks;

a transform means for determining transform coefficients for each block of the image data by performing an orthogonal transform to each of the divided image data;

a first bit-allocation means for allocating bits to the blocks depending on statistical values of the transform coefficients of respective ones of the blocks so that an amount of information for each of regions of a regular size of the image data is made constant;

a second bit-allocation means for allocating bits to the transform coefficients of each block so that the number of bits falls within a range of the number of bits having been allocated to the corresponding block;

a quantization means for quantizing each of the transform coefficients by a quantization step depending on the number of bits assigned thereto to prepare quantization indices;

an encoding means for encoding the quantization indices and transmitting the encoded quatization indices as codes along with additional information at a constant bit rate;

a decoding means for decoding the codes received from the encoding means via a transmission medium to restore the quantization indices;

a third bit-allocation means for determining the number of the bits allocated to each transform coefficient based on the corresponding restored quantization indices and the additional information;

an inverse quantization means for inversely quantizing the quantization indices of each block depending on the decoded quantization indices, the additional information, and the number of bits assigned to the corresponding one of the blocks so as to restore the transform coefficients of each block;

an inverse transform means for performing an inverse orthogonal transform to the restored transform coefficients of each block to thereby restore the picture data for each block; and means for reconstructing an image by combining the restored image data of the blocks.

In this image data coding system, since the bit allocations of the block-adaptive type and transform coefficient-adaptive type are both used, it is possible to make an optimum bit allocation which minimizes the quantization error within a fixed amount of information. Besides, since the feed-forward type information compression using a transform coding is effected, information content, that is, the amount of information can be accurately controlled even for motion pictures that require real-time processing. Moreover, this image coding system can cope with any transmission rate and can make the transmission rate constant within a considerably narrow range, it is adaptable to any type of equipment that requires compression of image data irrespectively of the type of the transmission media or recording media.

In order to achieve the above third object, the present invention provides an image coding system wherein digital image data in each of regions of a regular size is divided into a plurality of blocks and amounts of information are adaptively allocated to each block whereby the picture data is encoded, the image coding system has:

means for determining a histogram of the amounts of information to be allocated to each block depending on either one of variance of pixel values and a dynamic range of each block in such a way that the total sum of the amounts of information of each block coincides with a predetermined reference value; and means for allocating amounts of information to each block according to the corresponding histogram.

In this image coding system, input image data is divided into a plurality of blocks, and reference values for use in assigning amounts of information to the blocks are calculated as a function of the variance of pixel values or dynamic range of a relevant block. The histogram of the information contents or amounts of information to be allocated to each block is determined from values of the blocks which have been calculated so that the total amount of information of all the blocks is made constant. Each block has an amount of information assigned according to the determined histogram. Since the distribution of amounts of information to be assigned to blocks, as described above, is determined prior to coding so that the total information amount is made constant, amounts of information can be controlled accurately, and bit allocations adapted to images can be realized. Also, since it is not necessary to rearrange the values calculated for each block, the system can be constructed by small-scale hardware.

In order to achieve the fourth objective, the present invention provides a high-efficiency coding system wherein digital image data is divided into blocks within a certain range, an orthogonal transform is performed to each block to give transform coefficients of each block, the blocks are classified into different classes depending on statistic nature of the image data of each block, a specified number of bits are respectively allocated to the transform coefficients of each block with respect to each class classified so that the transform coefficients are quantized and encoded, comprising:

means for preparing a plurality of bit-allocation patterns to be used in bit allocation to the transform coefficients of blocks in respective ones of the classes depending on nature of blocks belonging to the classes; and means for selecting one from among the prepared plurality of bit allocation patterns of each block in a manner that a specified condition is satisfied;

whereby the transform coefficients of each block are quantized according to a corresponding selected pattern.

According to the high-efficiency coding system of the present invention, the pattern preparation means prepares a plurality of bit allocation patterns which are patterns of the numbers of bits to be allocated to the transform coefficients of each block with respect to each sorted class according to the characteristics that the blocks within each class have, and the pattern selection means selects one from among the prepared plurality of bit allocation patterns for each block according to specified conditions. Thus, if the specified conditions are set so that the pattern selection means selects a bit allocation pattern that minimizes the distortion resulting from quantization, then the transform coefficients can be quantized with the bit allocation pattern that corresponds to the characteristics of the image for each block of each class. As a result, blocks sorted into the same class can be encoded with reflection of whether edges are present or not or of textures and the like, allowing distortions of reconstructed images to be reduced to an extremely small extent.

Also, since the coding system uses a plurality of patterns within each class after the blocks are classified according to information content, the control of information content is terminated at a stage at which the blocks are classified. This allows the information content to be simply controlled.

The above arrangement enables development of a high-efficiency coding system which is extremely reduced in distortion of images.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a graph showing the relationship between the variable A and the total number of bits $\Sigma b(i)$;

DETAILED DESCRIPTION OF THE PREFERRED EMBODIMENTS

First Embodiment

A bit allocation method of the first embodiment of the present invention is described below with reference to FIGS. 1 through 6.

Figure 2:
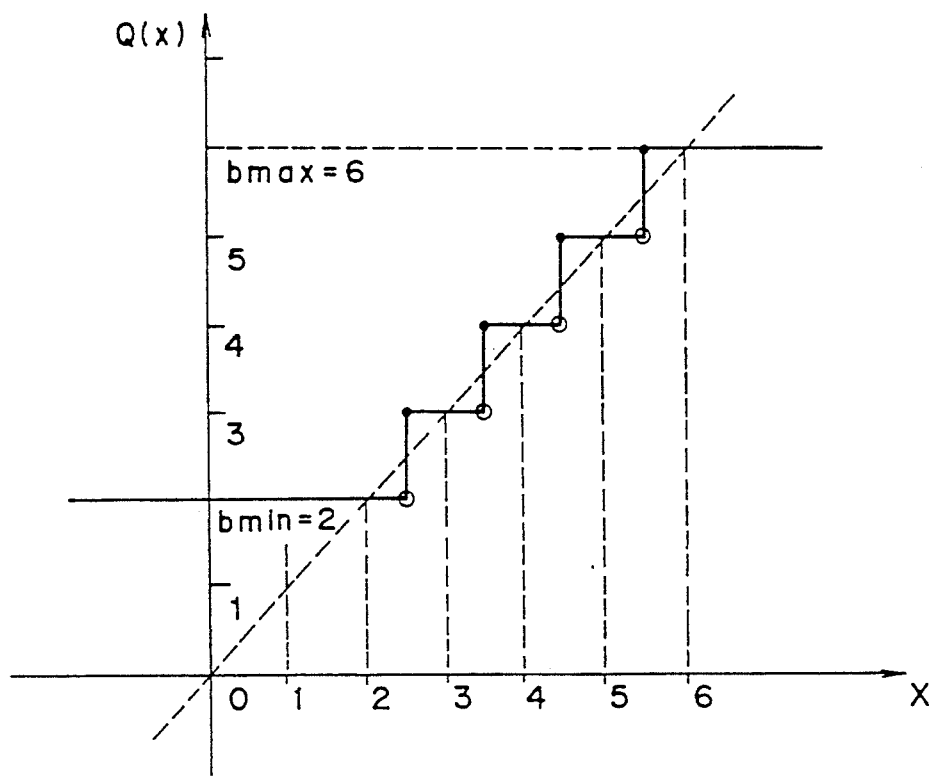
FIG. 2 is a graph showing the relationship between the input and the rounded-in-integer output.
Figure 3:
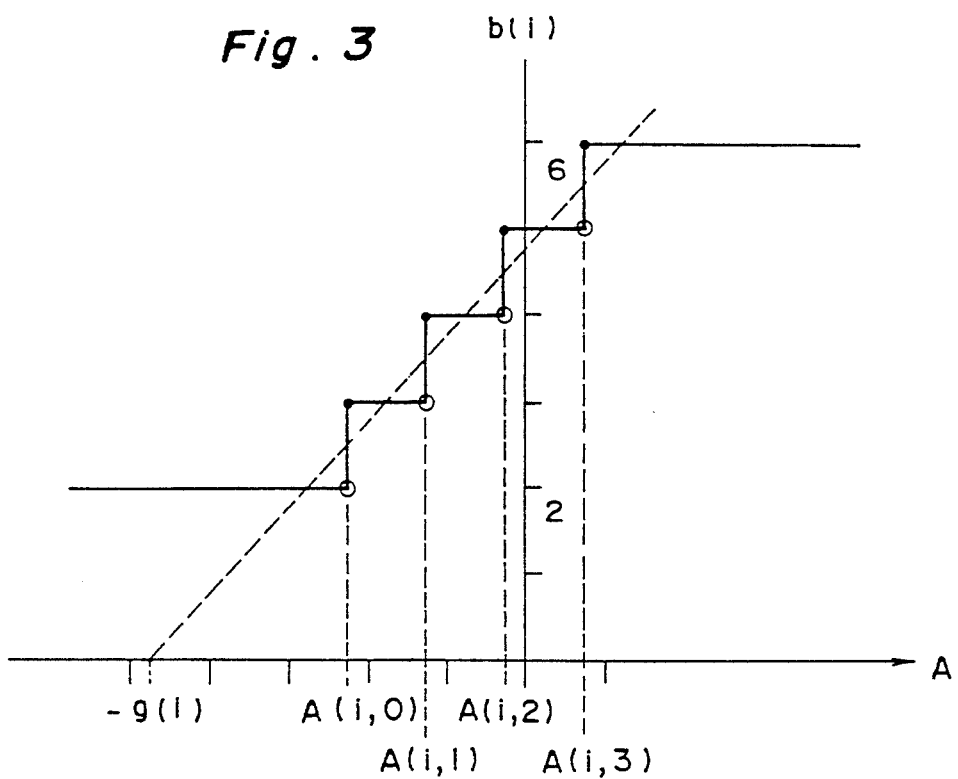
FIG. 3 is a graph showing the relationship between a variable A and the number $b(i)$ of bits to be allocated to the ith transform coefficient.

According to a bit allocation method according to the first embodiment of the present invention, the abovementioned formula (1) is transformed as follows:

$$\left. \begin{array}{l} f(i) = A + g(i) \\ g(i) = \ln(\sigma(i))^2/a \\ A = b_{avr} - \Sigma\{(\ln\sigma(i)^2)/N/a\} \end{array} \right\} \quad (3)$$

where f(i) is a bit allocation before the restriction of the formula (2) is added, and the bit allocation after the restriction is added is determined by the following formula:

$$b(i) = Q(f(i)) \quad (4)$$

where $Q(x)$ is the result of rounding x according to FIG. 2 showing the relationship between an input and the corresponding output rounded into an integer. According to the formulas (3) and (4), when g(i) is given, b(i) is represented as a function of A, as shown in FIG. 3. Accordingly, the total number of bits $\Sigma b(i)$ is also a function of A, as shown in FIG. 4.

The value that the total number of bits $\Sigma b(i)$ can take is one out of $\{N*b_{min}, N*b_{min}+1, \ldots, N*b_{max}\}$, where if $\Sigma b(i)=N*b_{min}$, b(i)'s can all be decided as $b_{min}$, and if $\Sigma b(i)=N*b_{max}$, b(i)'s can all be decided as $b_{max}$. Therefore, it is assumed here that the total number of bits B is given so as to satisfy $$B \in \{N*b_{min}+1, N*b_{min}+2, \ldots, N*b_{max}-1\}$$

Figure 1:
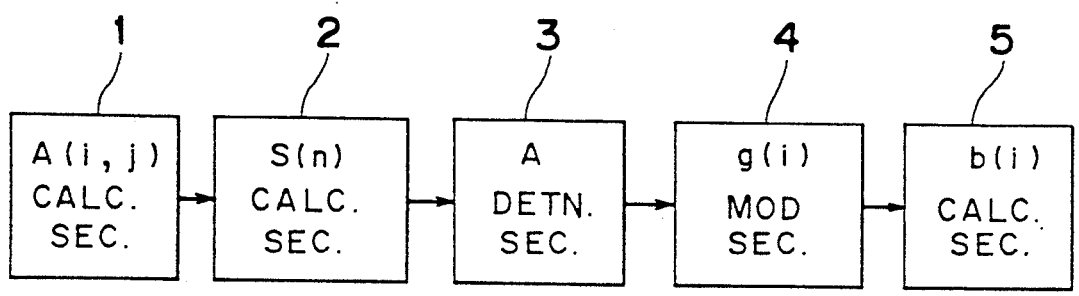
FIG. 1 is a block diagram showing a system for implementing a bit allocation method, which is a first embodiment of the present invention.

FIG. 1 is a block diagram of the system for carrying out an allocation method which is an embodiment of the present invention.

First, at an A(i, j) calculation section 1, A(i, j) is determined by the following formula:

$$A(i,j) = b_{min} - g(i) + 1/2 + j$$

$$(i=0, 1, \ldots, N-1; j=0, 1, \ldots, b_{max}-b_{min}-1)$$

This represents a point at which the value of b(i) increases by one when b(i) is a function of A (see FIG. 3).

At an S(n) calculation section 2, A(i, j)'s are arranged in the increasing order, which are assumed to be S(k) (where $k=0, 1, \ldots, N*(b_{max}-b_{min})-1$). S(k) represents a point at which $\Sigma b(i)$ increases by one when $\Sigma b(i)$ is a function of A. If the values of S(k) all differ from one another, the result is as shown in FIG. 4; otherwise, the values of $\Sigma b(i)$ may increase by two or more, starting with a certain point. For example, if S(k1)=S(k1+1), the increment is 2 at the point of A=S(k1).

At an A determination section 3, n is first detect, Lined by the following formula:

$$n = B - N*b_{min}$$

Thus, if the total number of bits $\Sigma b(i)$ increases by n from $N*b_{min}$, it will be B to be found. Hence an A that gives the total number of bits = B is $$A \in [S(n-1), S(n)]$$

Therefore, for example, A is determined by $$A = S(n-1) + \delta 1/2$$

$$\delta 1 = S(n) - S(n-1)$$

Whereas, if it happens that S(n)=S (n−1) (which will hardly occur to actual pictures), the total number of bits has changed by 2 or more in the foregoing A, with the result that there is no A that will make the total number of bits B. In this case, S(n) is made slightly larger by the operation of a g(i) modification section 4 so that the A determination section 3 can make a decision. Therefore, if S(n)≠S(n−1), g(i) is not modified, followed by the processing of a b(i) calculation section 5; otherwise, the processing by the g(i) modification section 4 is performed. At the b(i) calculation section 5, b(i) is calculated according to the aforementioned formulas (3) and (4).

At the g(i) modification section 4, g(i) is modified in the following manner:

On the presumption that $$S(n-m1-1) < S(n-m1) = \ldots = S(n-1) = S(n) = \ldots$$
$$= S(n+m2-1) < S(n+m2) \quad (5),$$

from among g(i)'s of (m1+m2) pieces corresponding to S(nm1), ..., S(n+m2−1), only g(i)'s of m2 pieces are made slightly smaller.

$$g(i) = g(i) - \delta 2$$

$$0 < \delta 2 < S(n+m2) - S(n+m2-1) \quad (6)$$

This operation allows the g(i)'s to be in the proper relation in their order of magnitude. This is because, with respect to the above g(i)'s of (m1+m2) pieces, their respective differences from a maximum g(i) never fail to be more than $S(n+m2) - S(n+m2-1)$, as understood from the way of preparing S(k) as in FIG. 4. Accordingly, $\delta 2$ is assumed, for example, as $$\delta 2 = [S(n+m2) - S(n+m2-1)]/2$$

Figure 5A:
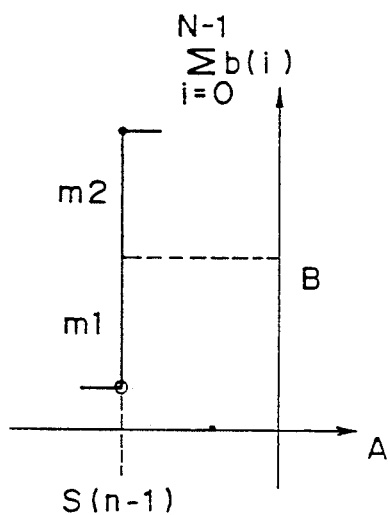
FIGS. 5A and 5B are graphs showing the $\Sigma b(i)$ before and after modifying $g(i)$ with respect to the vicinity of $A = S(n-1)$.
Figure 5B:
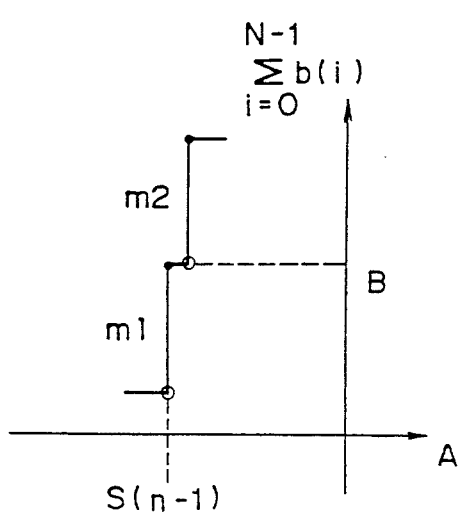

Then, a graph of $\Sigma b(i)$ varies around $A = S(n-1)$. FIG. 5A shows a graph before the modification of g(i) and FIG. 5B shows a graph after the modification thereof. The A to be found is determined, for example, as $$A = S(n-1) + \delta 2/2$$

Figure 6:
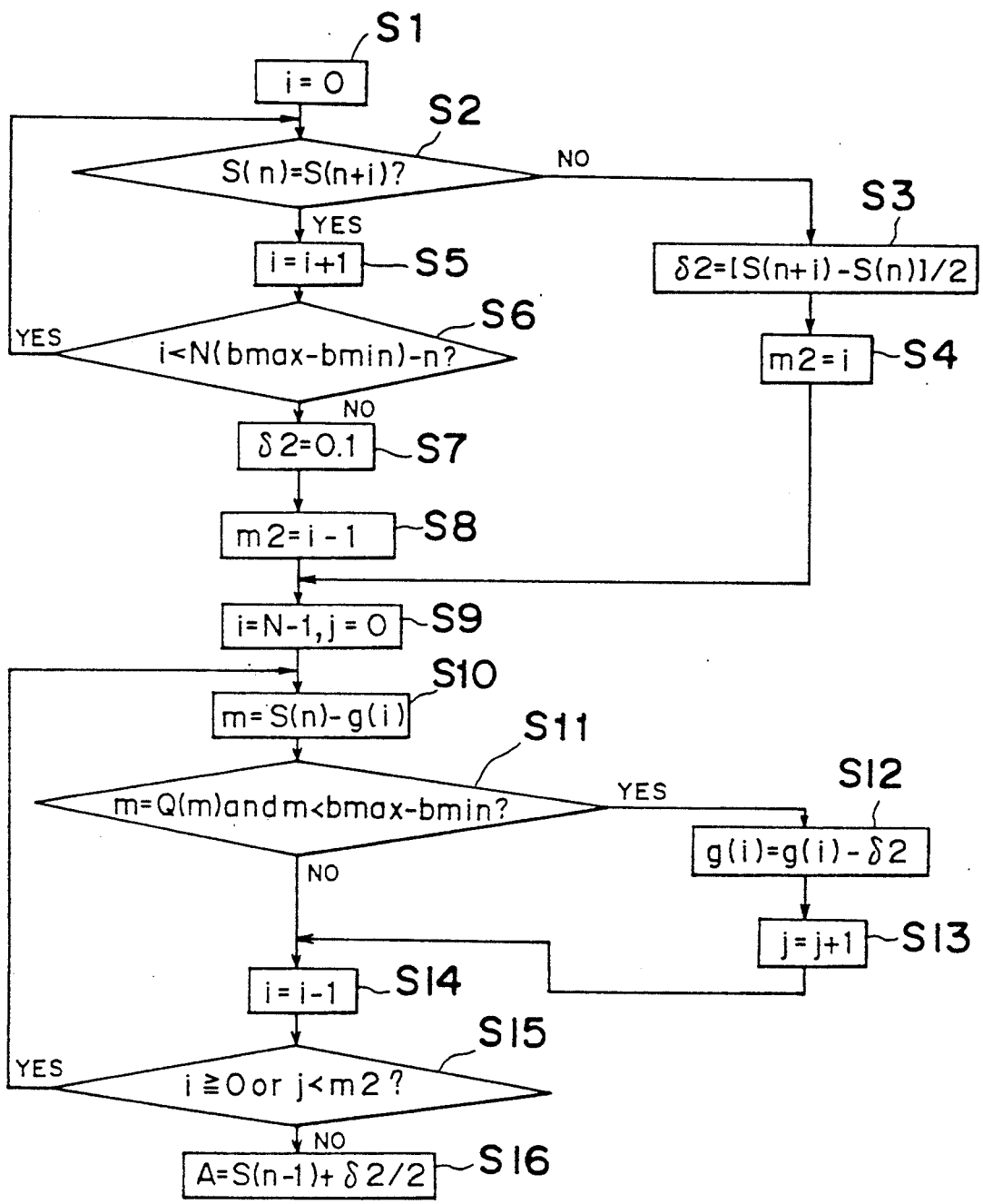
FIG. 6 is a flow chart showing the processing performed by the $g(i)$ modification section in FIG. 1.

FIG. 6 is a flow chart showing the processing performed at the g(i) modification section 4.

First, at steps S1 through S9, such a minimum i as allows $S(n) < S(n+i)$ (i.e., m2 in formula (5)) to hold is found and $\delta 2$ in formula (6) is calculated. It is to be noted that, if n+i is equal to $N^*(b_{max} - b_{min})$ at step S6, it is impossible to determine $\delta 2$ by formula (5) and therefore $\delta 2$ is set to a proper small value at step S7 (here, 0.1). At next steps S10 through S15, out of the g(i)'s corresponding to S(n−m1), ..., S(n+m2−1), g(i)'s of m2 pieces are decreased by $\delta 2$. Of these steps, steps S10 and S11 are a part to search a g(i) corresponding to a S(k) that has the same value as S(n). Step S16 is a part to determine the A.

Although the above description has been made in the case where b(i) is restricted to positive integers by formula (1), the present method is also applicable to cases where b(i) is restricted to equally incremented real numbers. For example, it can be applied to $$b(i) \in \{1.5, 1.7, 1.9, 2.1\}$$

In this case, the step width of the functions shown in FIGS. 2 to 4 should be set not to 1 but to, for example, 0.2 or the like.

Second Embodiment

Figure 7:
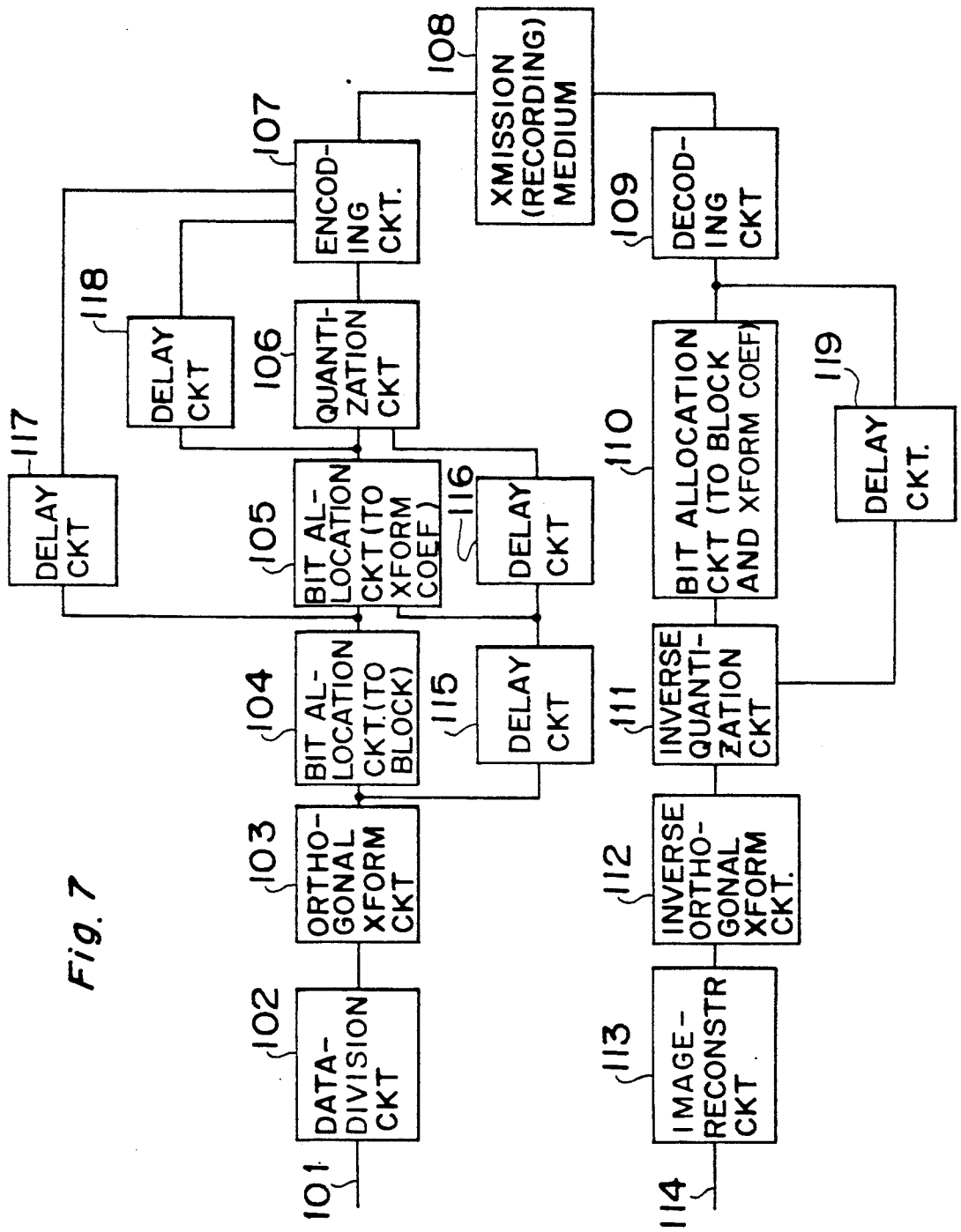
FIG. 7 is a block diagram of a picture data coding system according to a second embodiment of the present invention.

Now a second embodiment of the present invention is described with reference to FIGS. 2 to 3 and FIGS. 7 to 9. FIG. 7 is a block diagram of a picture data coding system according to this embodiment. An input terminal 101 receives video picture digital data of, for example, 8 bits per sample. Receiving the digital picture data, a data-division circuit 102 divides it into a plurality of blocks, each of a size of, for example, 8 pixels × 8 pixels.

An orthogonal transform circuit 103, receiving the picture data divided into blocks as above, performs a two-dimensional orthogonal transform to the data for each block. Then the orthogonal transform circuit 103 feeds the resulting transform coefficients to a bit allocation circuit 104, which allocates bits to each block, and a delay circuit 115. Available methods for the orthogonal transform in the orthogonal transform circuit 103 include a DCT (discrete cosine transform), a DST (discrete sine transform), and Hadamard transform. If variance for each block is used for different blocks in the bit allocation circuit 104, such a method as the DCT should be used in which the variance of picture data can be calculated from the transform coefficients. If it is impossible, the bit allocation circuit 104 is arranged not after but before the orthogonal transform circuit 103, or otherwise in parallel with the orthogonal transform circuit 103. In this case, however, since the part where variances are calculated involves additional work for determining an average value for each block, the circuit scale of the bit allocation circuit 104 is made a little larger.

The bit allocation circuit 104, when receiving a transform coefficient from the transform circuit 103, first calculates the variance value for each block, and then on totaling variance values of each block within a certain range (e.g., 1 frame), determines the average number of bits (average bit length) to be allocated to each block depending on the variance values so that information content of the picture data within the above-mentioned range becomes a predetermined value. This predetermined value has been obtained by calculating backward from the required bit rate. The bit allocation circuit 104 feeds the number of bits to be allocated to each block to a bit allocation circuit 105, which allocates bits to each transform coefficient, and a delay circuit 117. Although in this embodiment variances of picture data are used as reference for performing the bit allocation to blocks, it is also possible to use a dynamic range of picture data. When the dynamic range is used, it is not necessarily required to arrange the bit allocation circuit 104 after the orthogonal transform circuit 103, nor to feed transform coefficients.

The bit allocation circuit 105 receives average numbers of bits allocated to each block from the bit allocation circuit 104, while the bit allocation circuit 105 receives transform coefficients from the delay circuit 115. The bit allocation circuit 105 first takes out a transform coefficient for each frequency component in each block to calculate the average and variances of the transform coefficients, and according to the calculated variances, calculates the number of bits to be allocated to the respective transform coefficients within the range of the number of bits allocated to each block. The bit allocation circuit 105 feeds the calculated average and variances of the orthogonal transform coefficients to a quantization circuit 106 and a delay circuit 118. The bit allocation circuit 105 also feeds the number of bits to be allocated to each coefficient to the quantization circuit 106.

Based on the above average, variance, and number of bits sent from the bit allocation circuit 105, the quantization circuit 106 quantizes the transform coefficients fed from the orthogonal transform circuit 103 via the delay circuits 115 and 116. The quantization circuit 106 first calculates a quantization step size of each transform coefficient using the number of bits and variance assigned to each transform coefficient. To do this, for example, a quantization step size for input having Laplace distribution of variance 1 is previously prepared as a reference step size, and this is multiplied by the variance, thus determining the step size for each transform coefficient. Thereafter, each transform coefficient is quantized by the determined quantization step sizes and a quantization index is prepared, which is then fed to an encoding circuit 107. Different quantization methods may be used between AC and DC components of transform coefficients.

The encoding circuit 107 encodes the quantization index output from the quantization circuit 106, the number of bits allocated to each block output from the delay circuit 117 as additional information, and the average and variance of each transform coefficient output from the delay circuit 118, feeding the results to a transmission medium (or recording medium) 108. Although various coding methods are available, they are required to be reversible and capable of making the bit rate constant. It is to be noted that practically, there is provided a transmission line encoding circuit (not shown), intended for error correction and for other purposes, between the coding circuit 107 and the transmission medium 108.

The data from the transmission medium 108 is fed to a decoding circuit 109 via a transmission line decoding circuit (not shown). The decoding circuit 109 restores the quantized index, the number of bits to each block, and the average and variance of each transform coefficient by the reverse operation of the coding circuit 107, feeding the decoded results to a bit allocation circuit 110, which assigns bits to blocks and transform coefficients, and a delay circuit 119. It is possible to omit the encoding circuit 107 and the decoding circuit 109.

A bit allocation circuit 110 calculates the number of bits to be allocated to each transform coefficient based on the number of bits to each block and the variance of each transform coefficient received from the decoding circuit 109, feeding the calculation results to an inverse quantization circuit 111.

The inverse quantization circuit 111 inversely quantizes the quantization indices received from the delay circuit 119 using the number of bits to each transform coefficient received from the bit allocation circuit 110 and the average and variance of each transform coefficient received from the delay circuit 119 to restore the orthogonal transform coefficients, which are then sent to an inverse orthogonal transform circuit 112.

The inverse orthogonal transform circuit 112 restores picture data block by block from the transform coefficients received from the inverse quantization circuit 111 by performing an inverse orthogonal transform thereto. An image-reconstruction circuit 113 turns back the restored data to normal picture data as it was before being divided into blocks and outputs this picture data to an output terminal 114.

The delay circuits 115 through 119 are practically made up of frame memories or the like.

The bit allocation circuits 104, 105, and 110 are described below in more detail.

First, the bit allocation carried out by these circuits is theoretically explained. To allocate bits to transform coefficients, for example, the following bit allocation theory is utilized in which larger numbers of bits are allocated to larger-in-variance transform coefficients and smaller numbers of bits to smaller-in-variance transform coefficients, thereby allowing coding to be carried out by a smaller amount of data on the whole:

$$b(i) = bavr + \left[ \ln(\sigma(i)^2) - \sum_{i=0}^{N-1} \ln(\sigma(i)^2)/N \right]/a \quad (11)$$

$(i = 0, 1, \ldots, N-1)$ where b(i) is the number of bits to be allocated to the ith transform coefficient, $\sigma(i)^2$ is a variance of the ith transform coefficient, bavr is the average number of bits, N is the total number of transform coefficients, and a is a constant.

Whereas formula (11) is a formula that holds in respect to bit allocation to transform coefficients, it can also be applied to bit allocation to blocks. In such a case, b(i) will be the number of bits to be allocated to the ith block, $\sigma(i)^2$ will be the variance of the ith block, bavr will be the average number of bits per block (which is obtained by dividing the total information content by N), and N will be the total number of blocks.

As described in the first embodiment, formula (11) can be rewritten as follows, which facilitates the bit allocation.

$$\left.\begin{array}{l}f(i) = A + g(i) \\ g(i) = \ln(\sigma(i)^2)/a \\ A = bavr - \left[\sum_{i=0}^{N-1} g(i)\right]/N\end{array}\right\} \quad (12a)$$

$$b(i) = Q(f(i)) \quad (12b)$$

$$b(i) \in \{b_{min}, b_{min}+1, \ldots, b_{max}-1, b_{max}\} \quad (12c)$$

where f(i) represents the number of bits obtained before the condition of formula 12(c) is added, b(i) is the result from rounding the f(i) to an integer, and Q(x) is a rounding function such as shown in the graph of FIG. 2.

The bit allocation based on formulas (12a) to (12c) is characterized in that since the total number of bits is represented as a function of A, the number of bits can be easily controlled by changing the value of A and that, after determining the value of A, b(i) can be easily determined by formulas (12a) and (12b).

Figure 8:
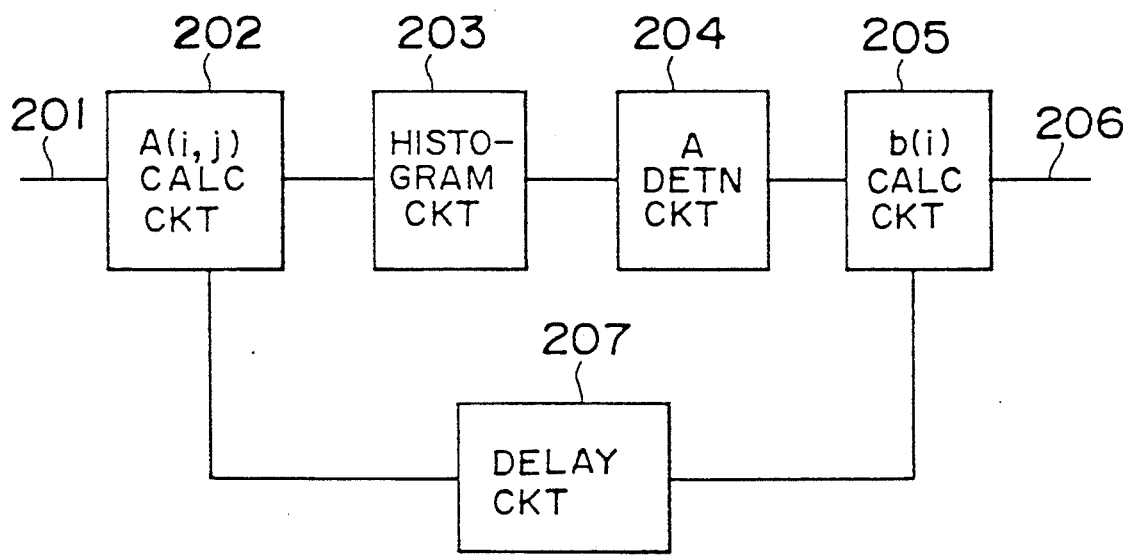
FIG. 8 is a block diagram of bit allocation circuits of the picture data coding system in FIG. 7.

An example of circuits in which bit allocation is performed according to this method is shown in FIG. 8. The description proceeds below about these circuits.

An input terminal 201 receives a value of variance. The bit allocation circuit 104 that allocates bits to blocks calculates the value of variance with the squared value of AC components of an orthogonal transform coefficient. The bit allocation circuit 105 that allocates bits to orthogonal transform coefficients calculates the value of variance after determining an average value of orthogonal transform coefficients of the blocks for each frequency component. The bit allocation circuit 110 is given the value of variance as an input.

An A(i, j) calculation circuit 202 first calculates g(i) by the above formula (12a) from the value of variance received from the input terminal 201. Then A(i, j) is determined by the following formula:

$$A(i, j) = b_{min} - g(i) + \tfrac{1}{2} + j \quad (13)$$

$(i = 0, 1, \ldots, N-1; j = 0, 1, \ldots, b_{max} - b_{min} - 1)$ where A(i, j), as shown in FIG. 3, represents a point at which if b(i) is a function of A, the value of b(i) increments by one, provided that the maximum and minimum numbers of bits to be allocated $b_{max}$ and $b_{min}$ and the total number N of transform coefficients (or blocks) are previously set. It is possible here to reduce the scale of hardware by linearly approximating $\log_2 X$ provided that the following transform has been done:

$$lnX = log_2 X / log_2 e \quad (14)$$

After the above calculations, the A(i, j) calculation circuit 202 feeds the values of A(i, j) to a histogram circuit 203, while it feeds the value of g(i) to a delay circuit 207.

The histogram circuit 203 sorts the values of A(i, j) into some levels according to their magnitudes, calculates the frequency for each level, and finally prepares cumulative histogram. Although precisely A(i, j)'s should be rearranged in the increasing order, it is not practical when real-time processing by hardware is considered. Thus, for example, a simplified method using histogram is used.

An A determination circuit 204 determines the value of "A" using the histogram prepared by the histogram circuit 203. Assuming that the set total number of bits is "B", it is necessary to increase the number of bits from the minimum number of bits $N \times b_{min}$ by "n" ($n = B - N \times b_{min}$). Therefore, the value of "A" is determined by looking for a point at which a cumulative histogram becomes "n" in the cumulative histogram.

The histogram circuit 203 and the A determination circuit 204 are realized using RAMs or the like. For example, when the values of A are quantized into 256 levels, use is made of a RAM of which addresses are of 8 bits, the values of A each corresponding to a respective one of the addresses of the RAM. Then using the RAM, cumulative histogram is prepared, an address including the value of n is found out, and a value of A is calculated backward from the address.

A b(i) calculation circuit 205 first calculates a value of f(i) by formula (12a) using the value of A fed from the A determination circuit 204 and the value of g(i) fed from the delay circuit 207. Thereafter, the b(i) calculation circuit 205 calculates a value of b(i) by formula (12b), and outputs the calculation result from an output terminal 206.

Figure 9:
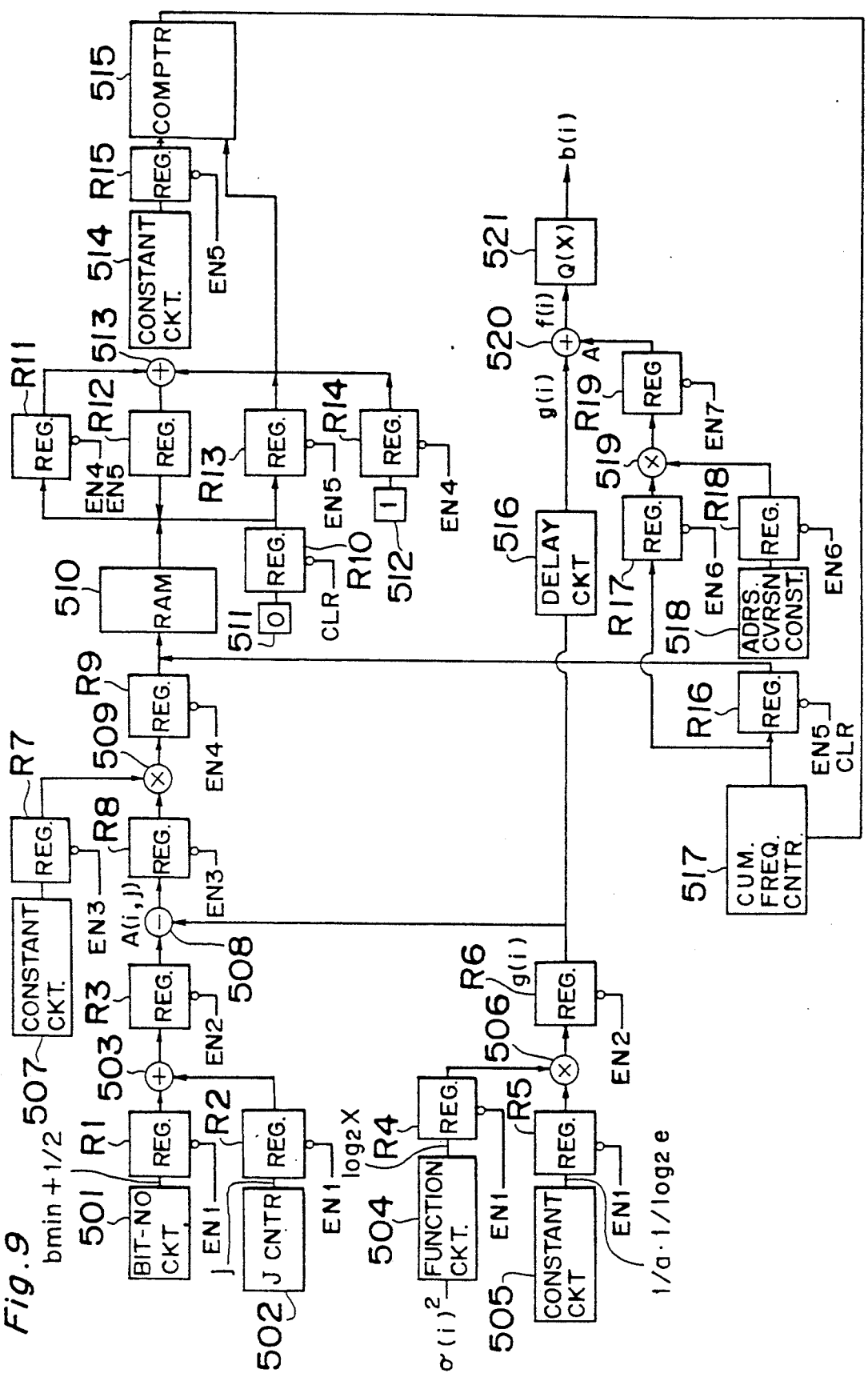
FIG. 9 is a block diagram showing a detailed construction of a bit allocation circuit in FIG. 8.

FIG. 9 shows a detailed construction of the circuit of FIG. 8. When a timing pulse EN1 is fed, a register R1 latches and holds a value of $b_{min} + \frac{1}{2}$ received from a bit-number circuit 501, while a register R2 holds a value of j received from a J counter 502. A register R4 holds a value of $log_2(\sigma(i)^2)$ produced by a function circuit 504, while a register R5 holds a value of $1/a \cdot 1/log_2 e$ produced by a constant circuit 505. An adder 503 adds up the values held by the registers R1 and R2, while a multiplier 506 calculates a product of the values held by the registers R4 and R5. When a timing pulse EN2 is fed, registers R3 and R6 latch the outputs of the adder 503 and the multiplier 506, respectively. As a result, the register R3 holds a value of $b_{min} + \frac{1}{2} + j$, while the register R6 holds a value of g(i).

A subtracter 508 subtracts the value of g(i) received from the register R6 from the value of $b_{min} + \frac{1}{2} + j$ received from the register R3, thereby determining A(i, j) (formula (13)). When a timing pulse EN3 is fed, this A(i, j) is entrapped into a register R8, while an address conversion constant produced by a constant circuit 507 is entrapped into the register R7. Then a multiplier 509 multiplies the A(i, j) received from the register R8 by an address conversion constant received from the register R7 to thereby effect address conversion, determining the address of the RAM. The result is held by a register R9 at a timing at which a timing pulse EN4 is fed, and further fed to a RAM 510. Then the frequency at which the RAM 510 yields outputs at that time is held by the register R11 at the timing of the timing pulse EN4. An adder 513 adds a value "1" produced by a constant circuit 512 and held by a register R14 to the frequency held by the register R11, feeding the addition result to the RAM 510 through a register R12 to update the value of histogram. A register R10, which is intended to clear the contents of the RAM 510 and registers R11 and R13, feeds the RAM 510 and the registers R11 and R13 with a value "0" received from a constant circuit 511 when a clear signal CLR is fed.

The above-described operations are performed for every i, whereby the histogram is completed. Thereafter, cumulative histogram is prepared based on the histogram, in which process an address of the RAM 510 for storing the cumulative frequency that coincides with the reference level n is detected. More specifically, the register R13 holds an output (cumulative frequency) from the RAM 510 each time a timing pulse EN5 is fed, while a comparator 515 compares the value with the reference level n received from a constant circuit 514 via a register R15. When the comparison results in disagreement, a cumulative frequency counter 517 increments by one, while a register R16 feeds the incremented value to the RAM 510 as the next address. When the comparison by the comparator 515 results in coincidence, an address produced by the counter 517 is held by a register R17 in response to a timing pulse EN6. This address forms an address of the RAM 510 for storing the cumulative frequency that coincides with the reference level n.

When the timing pulse EN6 is fed, an address conversion constant from an constant circuit 518 is entrapped into a register R18, while a multiplier 519 multiplies together this constant and the address held by the register R17 to thereby perform inverse transform of the address, so that a value A is obtained. The value A is held by a register R19 when a timing pulse EN7 is fed, while an adder 520 adds up the value A and g(i) fed via a delay circuit 516, determining f(i) (formula (12a)). Finally a rounding-to-integer circuit 521 rounds the f(i) into an integer, thus determining b(i) (formula 12b).

Third Embodiment

Figure 10:
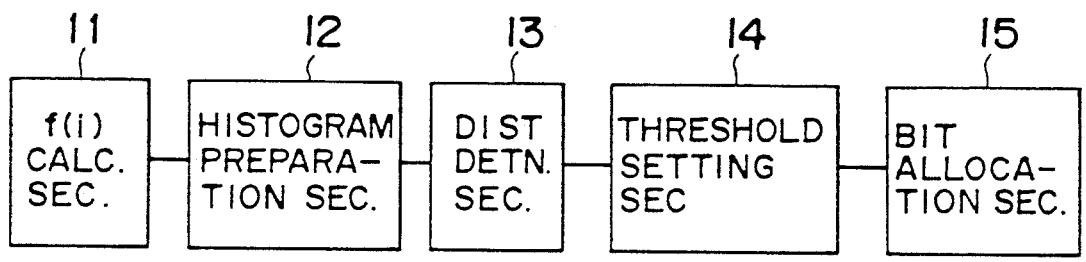
FIG. 10 is a block diagram of a coding system according to a third embodiment of the present invention.
Figure 11:
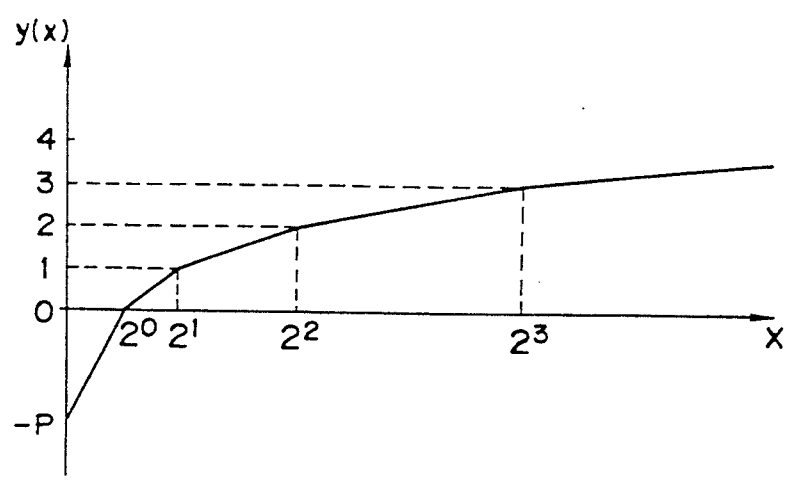
FIG. 11 is a graph used to determine the value of a function ln(x) by linear approximation.
Figure 12:
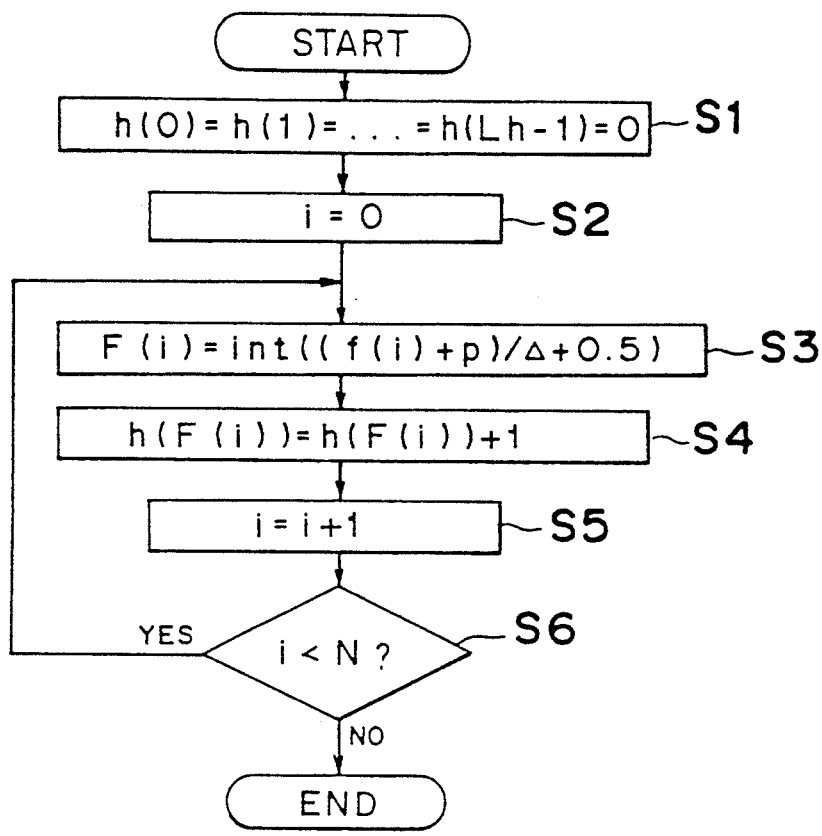
FIG. 12 is a flow chart showing the operating procedure of the histogram preparation section of the coding system in FIG. 10.

A third embodiment of the present invention is now described with reference to FIGS. 10 through 18. FIG. 10 is a block diagram of a coding system according to the present invention. According to this embodiment, the number b(i) of bits to be allocated to each of blocks of picture data is assumed to fall within a range of 0, 1, . . . , L−1, and the bit allocation is effected in accordance with the following formula (21), where i denotes a block number, B denotes the total number of bits, and N denotes the total number of blocks:

$$\sum_{i=0}^{N-1} b(i) = B \quad (21)$$

$$B \in \{0, 1, \ldots, N \times (L-1)\}$$

First, a f(i) calculation section 11 calculates a numerical value f(i) for each block according to the following formula:

$$f(i) = ln(\sigma(i)^2)/a \quad (22)$$

(i = 0, 1, . . . , N−1)
where $\sigma(i)^2$ denotes a variance of pixel values in the ith block, and "a" is a constant determined on the assumption of a typical picture.

The f(i) calculation section 11 determines ln(x) by an approximating calculation when calculating f(i) by formula (22). Using the graph shown in FIG. 11, it calculates by the following approximation:

$$\ln(x) = \log_2(x)/\log_2(e) \approx y(x)/\log_2(e)$$

where y(x) is defined by the following formula: Assuming that when $x < 1$, $k = p$, $n = -p$, and $x_0 = 0$, and when $2^m \leq x < 2^{m+1}$, $k = 2^{-m}$, $n = m$, and $x_0 = 2^m$, $$y(x) = n + k(x - x_0)$$

A histogram preparation section 12 prepares the histogram of f(i) calculated by the f(i) calculation section 11 When the range of variance is from 0 to $2^M$, the range of f(i) calculated by the f(i) calculation section 11 is from $-p/a/\log_2 e$ to $M/a/\log_2 e$, where $-p$ is a value of y(x) when $x = 0$. The histogram preparation part 12 equally divides the range of f(i) into intervals of Lh pieces and constructs a histogram h(k) by an algorithm shown in FIG. 12. More specifically, first h(0) to h(Lh−1) are initialized (step S1), so that $i = 0$ (step S2). Next, an interval number F(i) is identified by the formula $F(i) = \text{int}\{(f(i) + p)/\Delta + 0.5\}$ (step S3), where int(x) is a function to round x whole by omitting a fraction, and $\Delta$ is represented by the following formula:

$$\Delta = (M + p)/(Lh - 1)$$

Then, one is added to the histogram h(F(i)) for the interval number of F(i) (step S4). One is added to i (step S5), and if the resulting i is less than N (step S6), the processing returns to step S3 and the above mentioned steps are repeated.

A distribution determination section for determining a bit-allocation distribution 13 determines $f_{max}$ and $f_{min}$ represented by the following formulas based on the histogram determined by the histogram preparation section 12.

$$f_{max} = -p + \Delta \cdot F$$

for the maximum F that satisfies $h(F) \neq 0$ $$f_{min} = -p + \Delta \cdot F$$

for the minimum F that satisfies $h(F) \neq 0$

Figure 13:
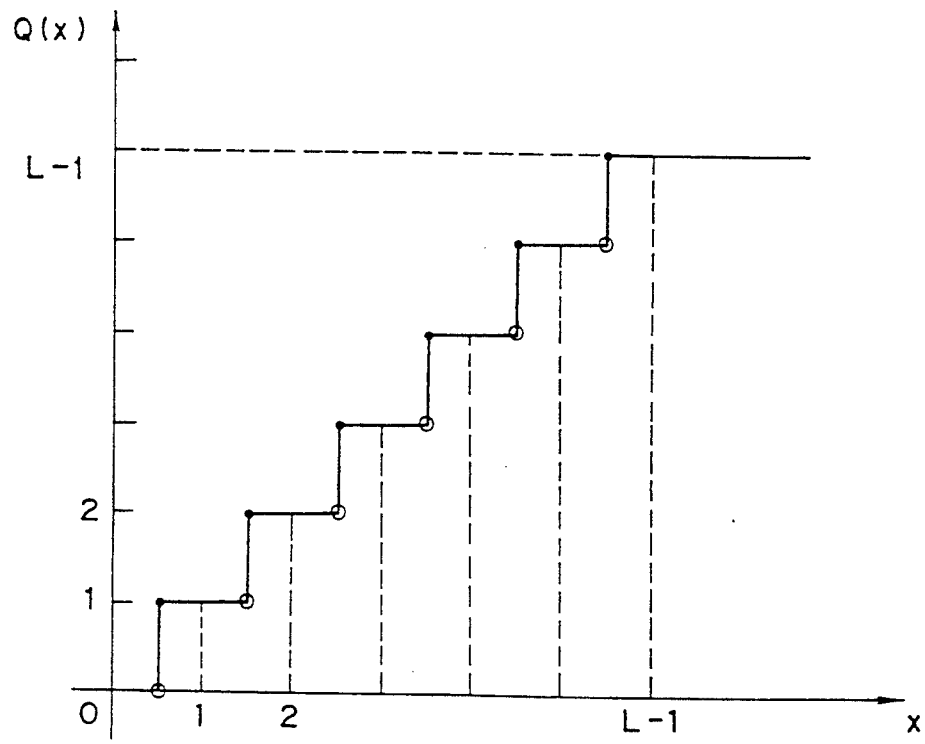
FIG. 13 is a graph showing the characteristics of a quantizer for quantizing the numerical value f(i) that corresponds to the information content of each block of picture data.

Also, the number of bits b(i) to be initially allocated is calculated by the following formula:

$$b(i) = Q(f(i)) + C$$

$$C = (f_{max} + f_{min})/2$$

where Q(x) denotes a quantization result by a quantizer having such a characteristic as shown in FIG. 13.

Figure 14:
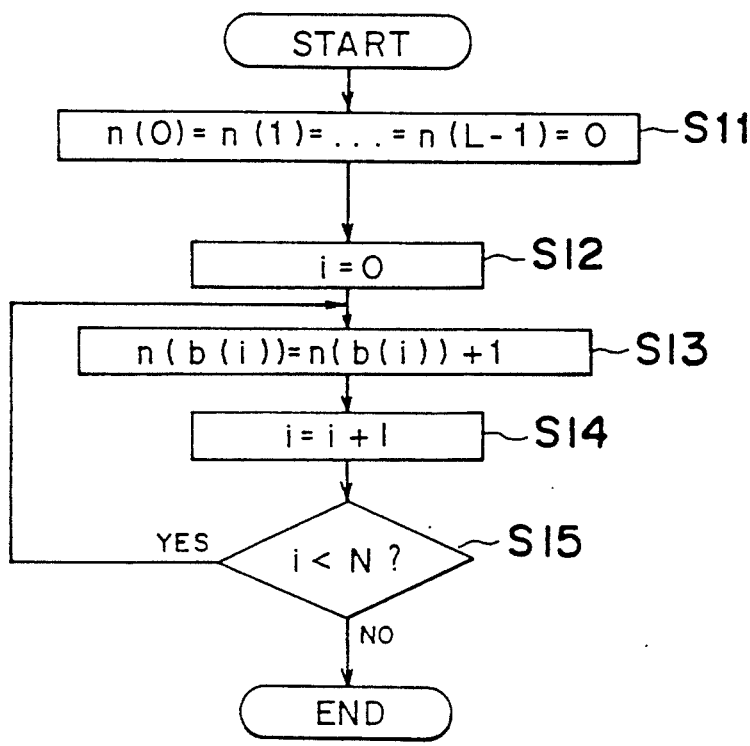
FIG. 14 is a flow chart showing the operating procedure of the distribution determination section of the coding system in FIG. 10.

Subsequently, for each initial bit allocation, the number of blocks to which the same number of bits is allocated, that is, a bit allocation distribution n(l) (l = 0, 1, ..., L−1) is determined by the algorithm as shown in FIG. 14. In more detail, first, n(0) to n(L−1) are initialized (step S11), while i is set to zero (i = 0) (step S12). Then one is added to the number of blocks n(b(i)) to which bits b(i) have been allocated (step S13). One is added to i (i = i + 1) (step S14), and if the addition result is less than N (step S15), the program returns to step S13, and the above steps are repeated.

Next the distribution determination section 13 calculates the total number of bits B' derived from the initial bit allocation according to the following formula:

$$B' = \sum_{l=0}^{L-1} l \cdot n(l)$$

Figure 15:
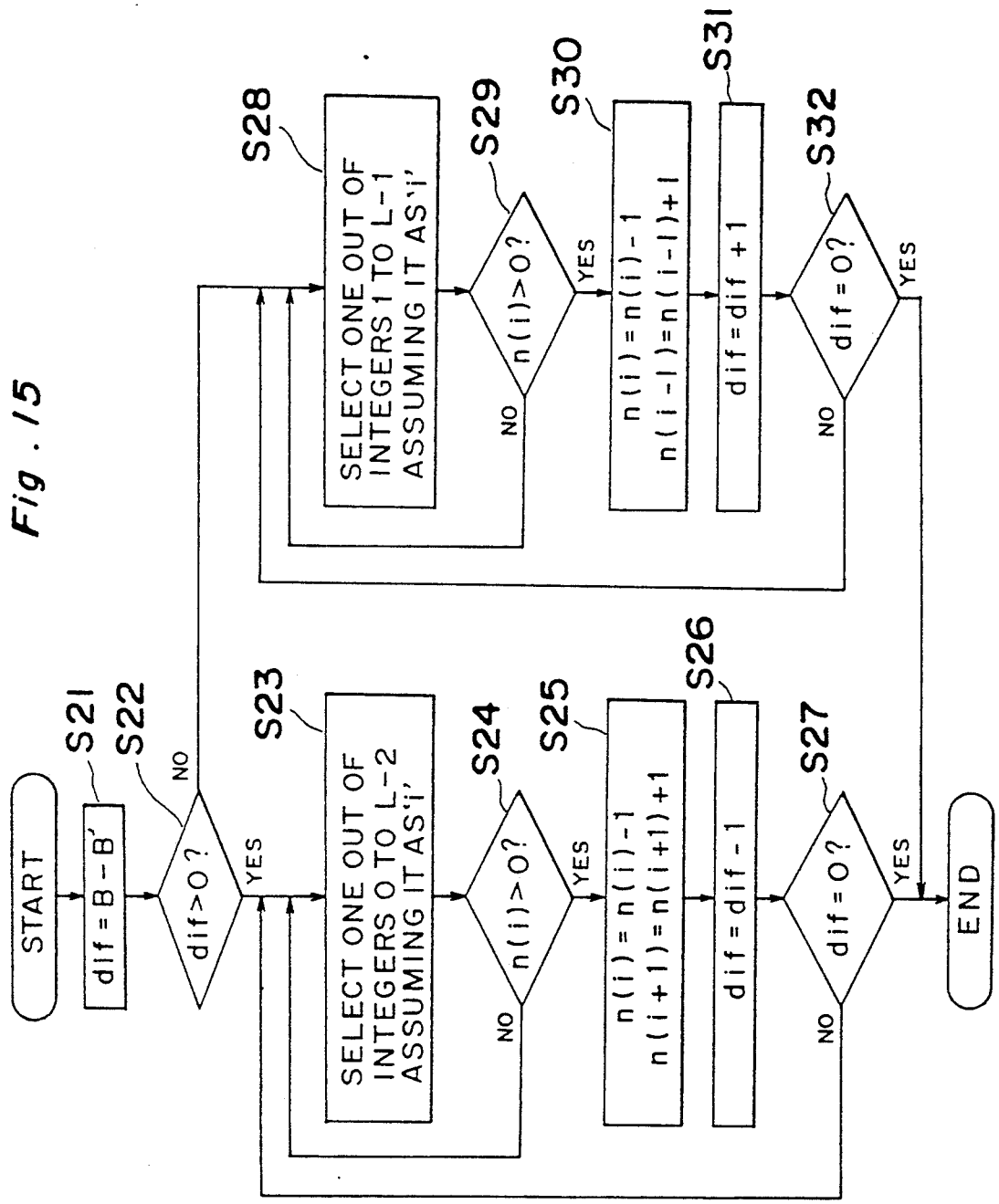
FIG. 15 is a flow chart showing the operating procedure for modifying bit allocation distribution n(l) by the distribution determination section of the coding system in FIG. 10.

As a result, if B' = B, then the processing of the bit-number allocation is terminated. On the other hand, if B' ≠ B, then the value of n(l) is corrected by the algorithm as shown in FIG. 15, so that B' = B.

That is to say, the distribution determination section 13 first determines a difference "dif" (= B − B') from the target total number of bits "B" (step S21). As a result, when the value of "dif" is positive, the processing goes to step S23, and if negative, to step S28 (step S22). Then when "dif" is positive, an integer in the range of 0 to L−2 is randomly chosen as i (step S23). If n(i) is positive, the processing goes to step S25, and if not, it executes step S23 again (step S24). Also, when n(i) is positive, n(i) is decreased by one, while n(i+1) is increased by one (step S25). By this operation the total number of bits B' increases by one, making the value of "dif" decreased by one (step S26). As a result, if "dif" is not 0, the processing returns to step S23 (step S27), thus the steps S23 through S27 being repeated until "dif" becomes 0, and when "dif" reaches 0, the processing is terminated.

On the other hand, when the value of "dif" is negative at step S22, an integer in the range of 1 to L−1 is randomly chosen as i (step S28). If n(i) is positive, the processing goes to step S30, and if not, it executes step S28 again (step S29). Also, when n(i) is positive, n(i) is decreased by one, while n(i−1) is increased by one (step S30). By this operation the total number of bits B' decreases by one, making the value of "dif" increased by one (step S31). As a result, if "dif" is positive, the processing returns to step S28 (step S32), steps S28 through S32 being then repeated until "dif" becomes 0, and when "dif" reaches 0, the processing is terminated.

Although such algorithm as causes B' to change by one in one loop is used in the above case, such a method is also effective that when "dif" is large, B' is made to change by 2 or more, and when "dif" becomes smaller, it is made to change one by one.

Further, without relying on such loop processing as described above, it is also allowed that the value of increment or decrement of each n(l) is determined from the initial value of "dif", and n(l) is corrected according thereto.

Otherwise, from among several patterns prepared beforehand for the bit allocation distribution n(l) that give the target total number of bits B, one may be selected which is closest to an initial n(l) pattern. This allows a target bit allocation distribution to be obtained after determining the initial bit allocation and its distribution without performing the processing of such algorithm as shown in FIG. 15.

Figure 17:
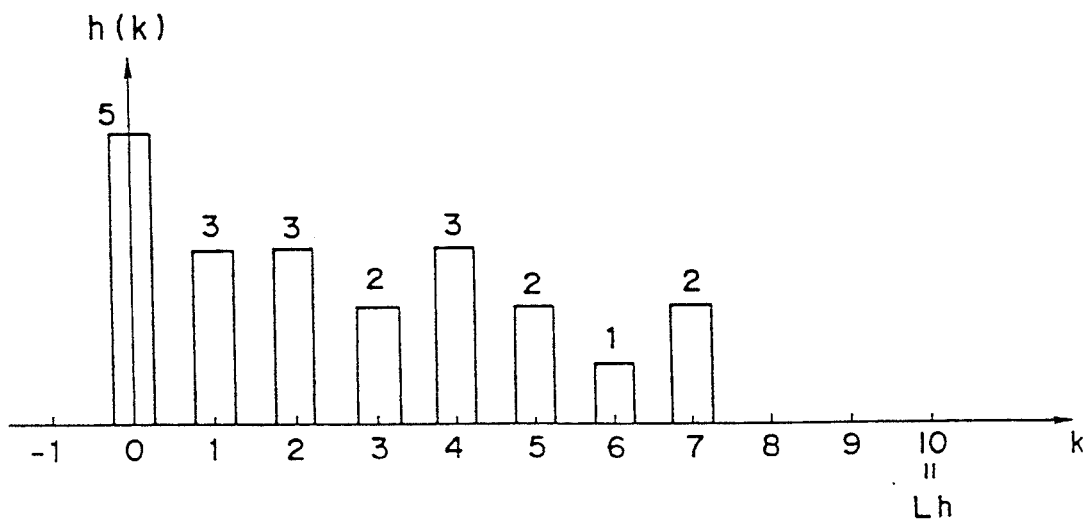
FIG. 17 is a graph showing an example of histogram h(k)
Figure 16:
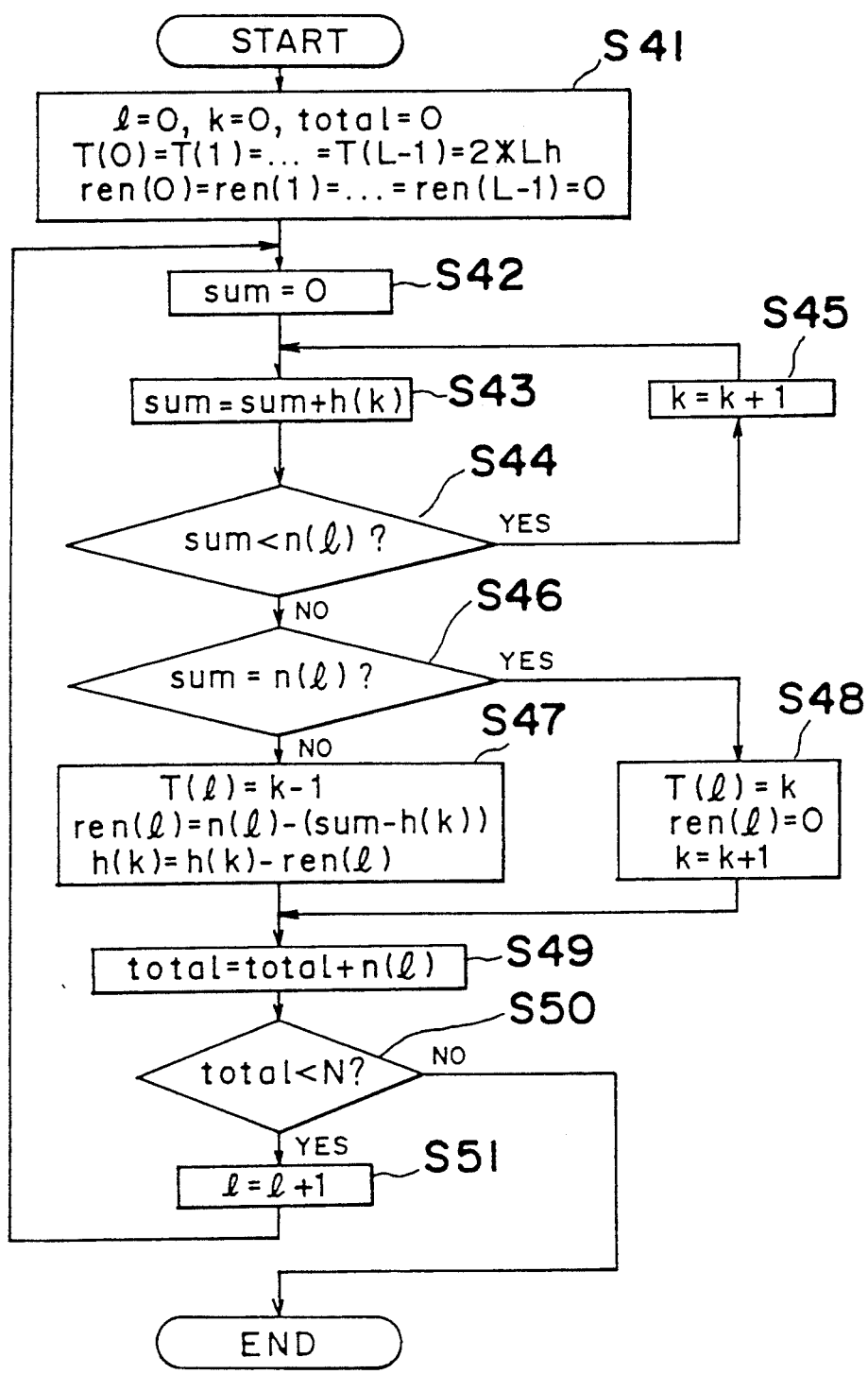
FIG. 16 is a flow chart showing the operating procedure of the threshold setting section of the coding system in FIG. 10.

Next, a threshold setting section 14 determines threshold value T(l) for allocating bits and ren(l) for incorporating the number of bits according to the bit allocation distribution n(l) determined by the distribution determination section 13 and the histogram h(k) of f(i). More specifically, as shown in FIG. 16, the threshold setting section 14 first initializes "l", "k", "total", T(0) to T(L−1), and ren(0) to ren(L−1) (step S41). Then it makes "sum" 0 (step S42), and thereafter adds h(k), i.e. h(0), to "sum" (step S43), and compares the addition result with n(l) (step S44). At this step, if the histogram h(k) is as shown in FIG. 17 and n(l) assumes a value as shown in Table 1, sum=5 and n(0)=3, and thus the processing proceeds to step S47, hence T(0)=−1, ren(0)=3−(5−5)=3, and h(0)=5−3=2.

| l    | 0  | 1 | 2 | 3 | 4 | 5  | 6  | 7  |
|------|----|---|---|---|---|----|----|----|
| n(l) | 3  | 6 | 1 | 6 | 4 | 1  | 0  | 0  |
| T(l) | −1 | 1 | 1 | 4 | 6 | 7  | 20 | 20 |
| ren(l)| 3 | 1 | 1 | 0 | 1 | 0  | 0  | 0  |

The threshold setting section 14 then adds n(0) to "total" (step S49), which results in total=3. It therefore adds 1 to l after step S50 so that l=1 (step S51), returning to step S42. Since step S43 results in sum =sum+h(0)=2 and step S44 results in Sum<n(l), 1 is added to k at step S45 so that k=1, returning again to step S43. Then step S43 yields sum=sum+h(1)=5 and step S44 yields sum<n(l), 1 is added to k at step S45 so that k=2, returning again to step S43, with the result that sum=sum+h(2)=8. This time step S44 yields sum>n(1), the processing undergoes S46 to S47, so that T(1)=2   −1=1,   ren(1)=6−(8−3)=1,   and h(2)=3−1=2. Thereafter step S49 yields total=3+6=9, and through steps S50 and S51, the processing returns to step S42. After that, similar processing is repeated until "total" becomes N at step S50, obtaining the final result of T(l) and ren(l) as shown in Table 1.

Figure 18:
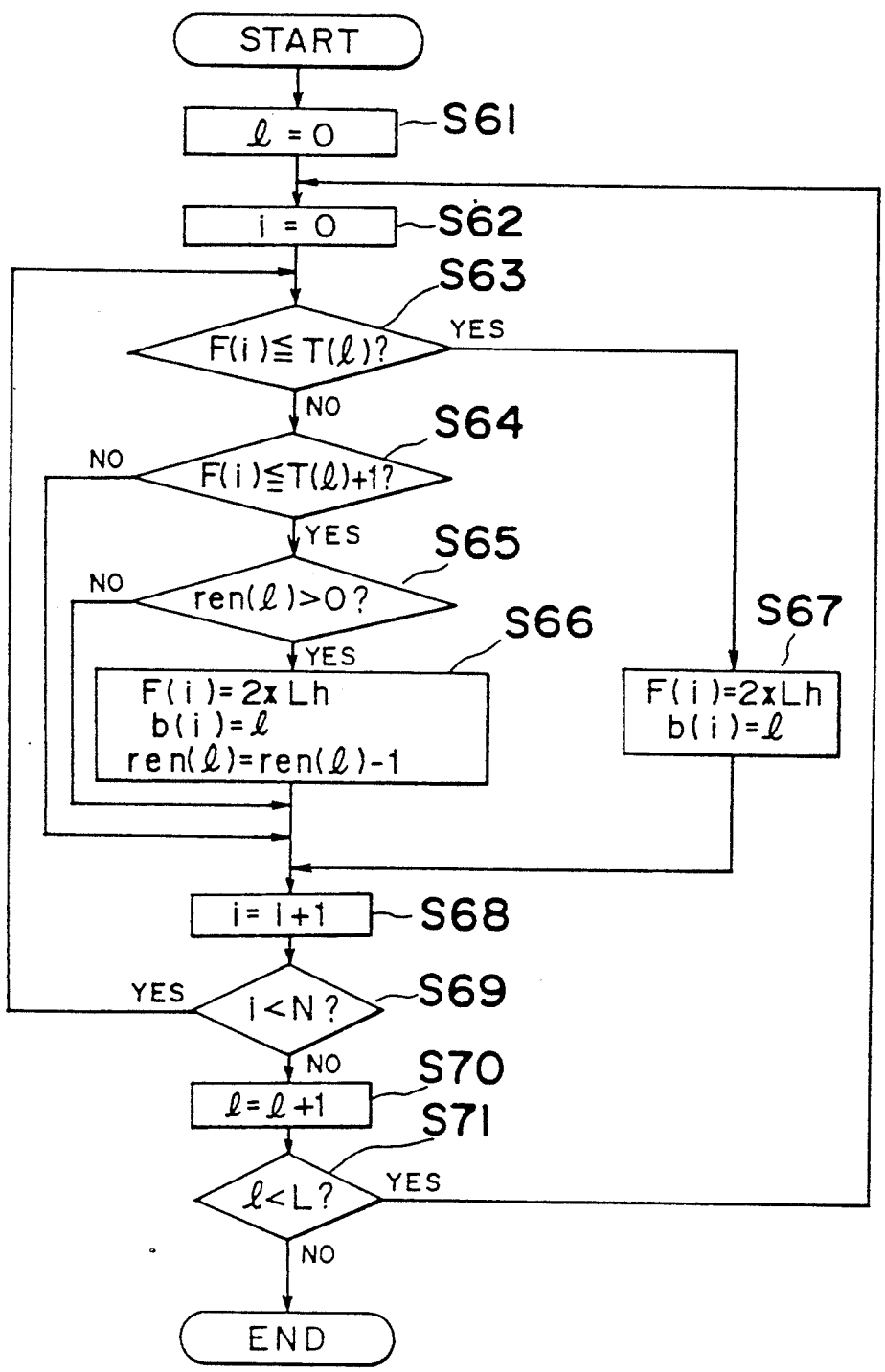
FIG. 18 is a flow chart showing the operating procedure of the bit allocation section of the coding system in FIG. 10.

A bit allocation section 15 performs bit allocation according to an algorithm, shown in FIG. 18, depending on T(l) determined by the threshold setting section 14 and ren(l) for incorporating the number of bits. The bit allocation section 15 first initializes l and i (steps S61 and S62), and then decides whether or not F(i)≦T(l) (step S63). If the decision is Yes, the result is b(i)=l accompanied by F(i)=2 * Lh (step S67), the program going to step S68. The reason why F(i)=2 * Lh is simultaneously effected in this step is to prevent b(i)=l +1 from resulting for the same i when the number of bits of l+1 is allocated.

If the decision of step S63 is No, then it is decided whether or not F(i)≦T(l)+1 (step S64). If the result is Yes, it is further decided whether ren(l)>0 (step S65). If the result is Yes, the processing goes to step S66, setting F(i)=2 * Lb, b(i)=1, and ren(l)=ren(l)−1. For such i's that give a negative answer at step S63 and an affirmative answer at step S64, ren(l) pieces out of them are to be assigned to l, in which case at step S66 l is assigned to the first ren(l) pieces of i's. In this case, however, ren(l) pieces of i's may be randomly selected so that l is allocated thereto.

On the other hand, if the decision is No at both steps S64 and S65, the processing goes to step S68, where i is increased by one (i=i+1), and it is decided whether the result i is smaller than N or not (step S69). If the decision is Yes, the program returns to step S63, performing a similar processing with the next i. If the result of step S69 is No, l is increased by one (step S70), and it is decided whether the resulting value l is smaller than L or not (step S71). If the decision is Yes, the program returns to step S62, performing a similar processing with the next i. If it is No, the processing is terminated. Thus, the bit allocation according to the allocated bit allocation distribution n(l) determined by the distribution determination section 13 is completed.

It should be noted that although in the above embodiment variance of picture data is used to determine the numerical value f(i) corresponding to the information content of each block, yet the dynamic range of picture data may also be used to determine f(i).

Besides, for a coding system that involves the orthogonal transform coding, a value obtained by formula (23) below can be used instead of the variance:

$$\sum_{n=1}^{N-1} w(n) * X(n) \quad (23)$$

where x(n) is square transform coefficient and w(n) is a factor representing human visual characteristics In this case, the value of the above formula (23) is determined for each block, and is substituted for variance in the formula (22) to determine f(i).

Fourth Embodiment

Figure 19:
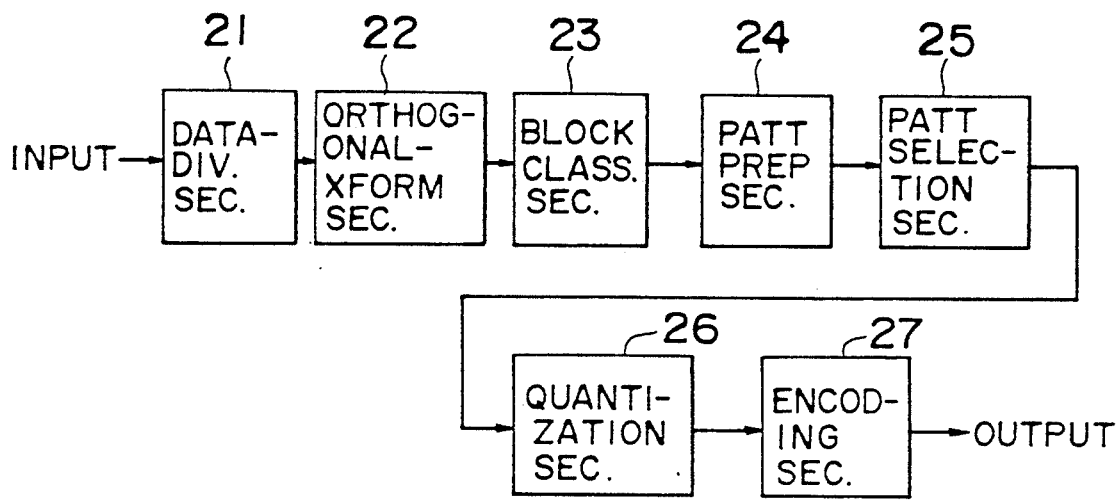
FIG. 19 is a block diagram schematically showing the construction of a high-efficiency coding system which is a fourth embodiment of the present invention.

Next a fourth embodiment of the present invention is described below with reference to FIGS. 19 to 23. FIG. 19 shows a high-efficiency coding system which is an embodiment of the present invention.

In FIG. 19, an input picture is a digital motion picture, which is fed frame by frame or field by field. A data-division section 21 divides the input picture into blocks of 4 pixels × 4 pixels or 8 pixels × 8 pixels or the like, arranges the picture data into data in the units of blocks, and thus outputting picture data of each block. An orthogonal transform section 22 performs orthogonal transform such as a DCT (discrete cosine transform) or Hadamard transform to picture data of each block received from the data-division section 21, thus producing transform coefficients for each block.

A block classification section 23 classifies the blocks into several classes based on a variance, a dynamic range or the like of the picture data of each block, and allocates different average numbers of bits to the blocks in different classes. For example, a lower average number of bits is allocated to a block that belongs to a class having a smaller variance, while a larger average number of bits is allocated to a block that belongs to a class having a larger variance. Such a way of allocating the number of bits allows the picture data to be encoded with a smaller amount of codes as a whole.

Assume that, as a result of the above processing, the ith block has been classified into a class designated as C(i). In this case, if the total number of classes is K, then C(i) is an integer in the range of 1 to K.

A pattern preparation section 24 that gives an example of the pattern preparation means is an especially important part in the coding system of the present embodiment, and prepares bit allocation patterns for the transform coefficients of the blocks. More specifically, the pattern preparation section 24 regards a set of transform coefficients having magnitudes belonging to one block as a vector, vector-quantizing the magnitudes of the transform coefficients for blocks of the same class. For example, with the number of code words of the kth class assumed to be V(k), code words are prepared using the LBG algorithm (Takahiro Saito: "Picture coding algorithm III," *The Journal of the Institute of Television Engineers of Japan,* Vol. 43, No. 11, pp. 1276–1284 (1989)). Then, based on the prepared code words, the number of bits to be allocated to a transform coefficient is determined. In more detail, when the vth code word of the kth class is assumed to be g(k, v, m), the number of bits b(k, v, m) to be assigned thereto is determined according to the following formula:

$$b(k,v,m) = bavr(k) + \left[ \ln(g(k,v,m)) - \sum_{j=1}^{M} \ln(g(k,v,j))/M \right]/a \quad (31)$$

$$(k = 1, 2, \ldots, K;\ v = 1, 2, \ldots, V(K);\ m = 1, 2, \ldots, M)$$

where K is the number of classes, V(k) is the number of code words of the kth class, and M is the number of pixels within one block (if one block is made up of 4 pixels × 4 pixels, then M=16). And furthermore, in formula (31) above, k is a class number, v is a code word number, bart(k) is the average number of bits assigned to the blocks of the kth class, and m is a transform coefficient number. In addition, a is a parameter representing the relationship between bit allocation and quantization distortion, being previously given.

Figure 20:
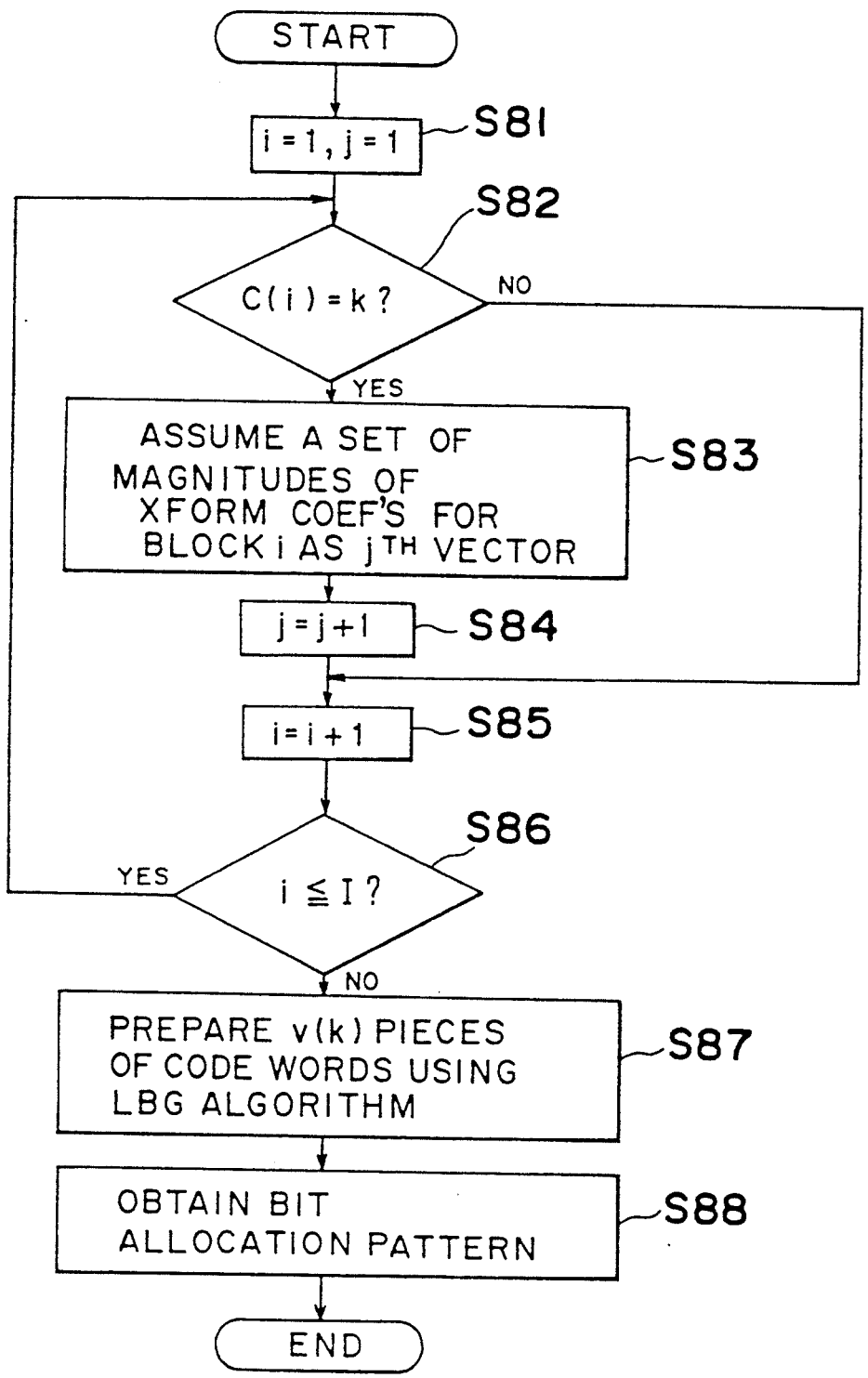
FIG. 20 is a flow chart showing the processing by the pattern preparation section of the high-efficiency coding system in FIG. 19.
Figure 21:
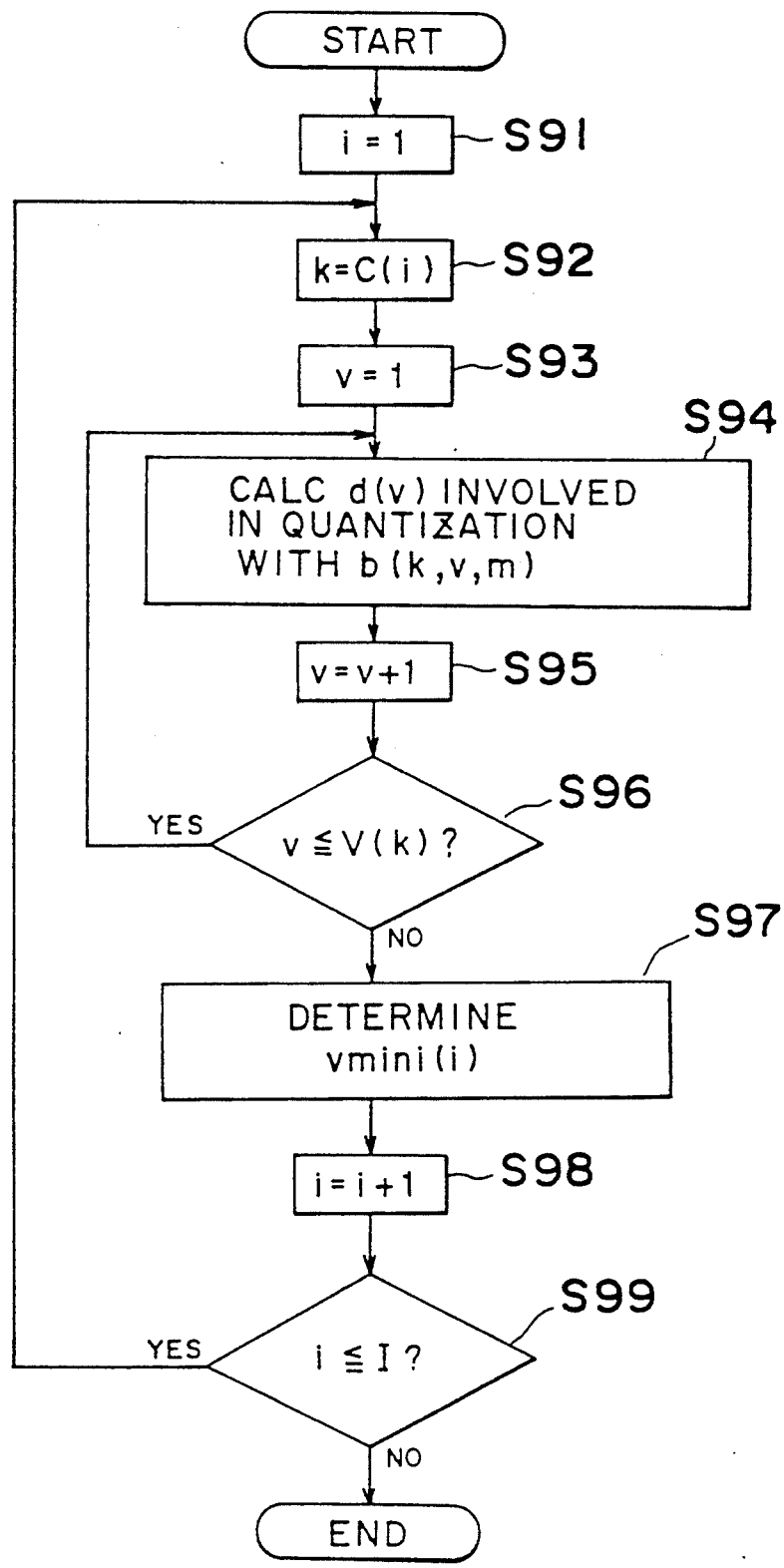
FIG. 21 is a flow chart showing the processing by the pattern selection section of the high-efficiency coding system in FIG. 19.
Figure 22:
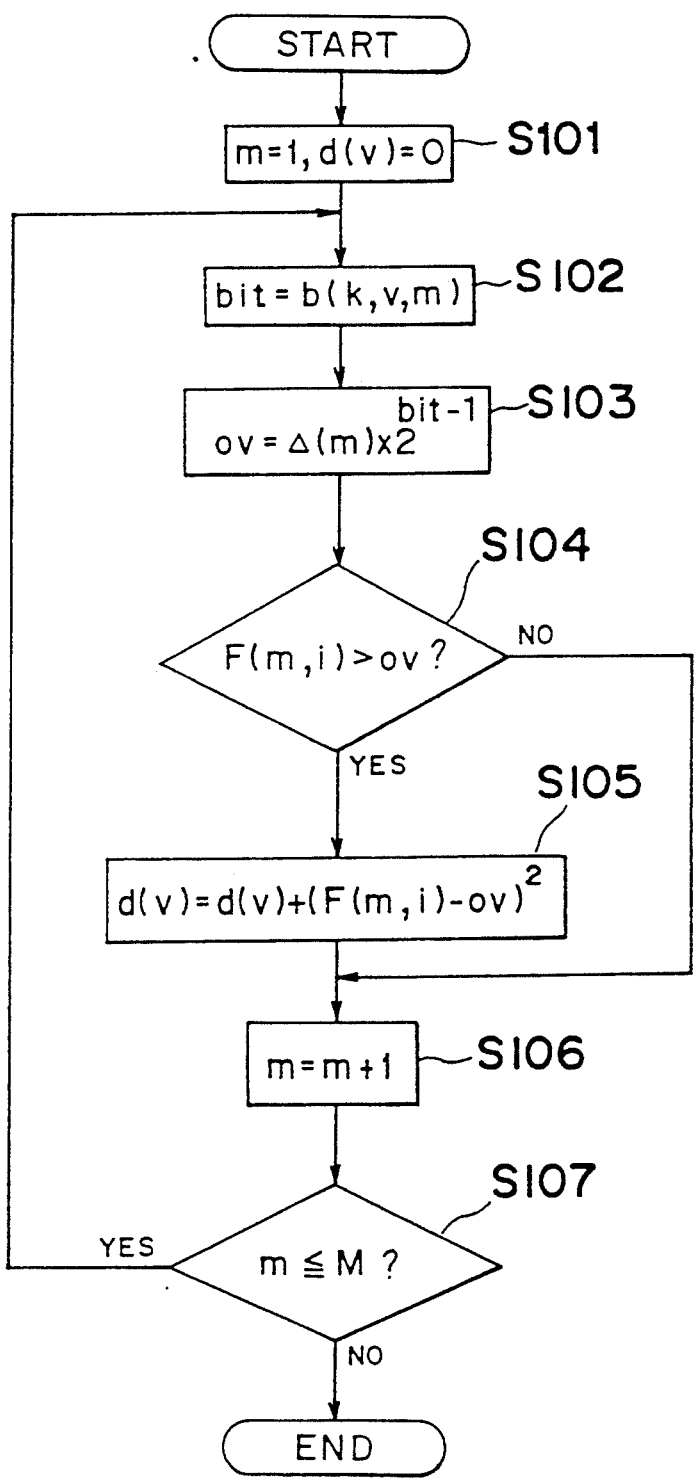
FIG. 22 is a flow chart showing the processing by another example of the pattern selection part of the high-efficiency coding system in FIG. 19.

The processing by the pattern preparation section 24 is detailed below, taking the case of the kth class, using the flow chart shown in FIG. 20. The pattern preparation section 24 first initializes i and j (step S81), and then decides whether or not C(i)=k to see if the ith block is included in the kth class (step S82). If the result is Yes, the processing goes to step S83, taking the set of magnitudes of transform coefficients of the block as the jth input vector to the LBG algorithm. Then one is added to j (step S84), while one is added to i (step S85), thereafter it is decided whether or not i is I or less (step S86). If the result is Yes, the above steps S82-S86 are repeated. Meanwhile, if the decision result of step S82 is No, the processing skips to step S85, where one is added to i, and if i is equal to or less than I at step S86, the processing returns to step S82. Such steps S81 through S86 give an input vector directed to the LBG algorithm of step S87.

At step S87, the pattern preparation section 24 produces V(k) pieces of code words from the input vector, using the LBG algorithm. Then at step S88 the pattern preparation section 24 obtains a bit allocation pattern from the prepared code words and the average bit length allocated to the kth class by formula (31).

In this case, since the number of bits to be allocated is an integer of, for example, 0 to 8, it is preferable to perform bit allocation by a method according to the first embodiment. That is, in the orthogonal transform coding, in order that the total number of bits becomes B and the bit allocation b(i) (i=0, 1, ..., N−1) of each transform coefficient can be uniformly quantized as a function of A that is shown in the following formula (32):

$$b(i) = Q(f(i)) = Q(A + (\ln \sigma(i)^2)/a) \quad (32)$$

(where f(i) is a bit allocation function without limiting b(i) to an integer, $\sigma(i)^2$ is a variance of each transform factor, Q(f(i)) is a function that uniformly quantizes f(i), and a is a given set value), such an A as satisfies the formula below is determined first, $$\sum_{i=0}^{N-1} b(i) = B$$

and thereafter b(i) is determined according to formula (32). As shown above, since the total number of bits is represented as a function of A, the number of bits can be easily controlled by changing the value of A.

As a result of the above-described processing, a plurality of bit allocation patterns are prepared with respect to each class. Although in this embodiment the bit allocation patterns are produced when picture data is encoded, bit allocation patterns can be previously prepared using typical pictures, and stored in proper storage so as to be used when picture data is actually encoded.

Referring to FIG. 19, a pattern selection section 25 that exemplifies the pattern selection means is especially important in the coding system of the present embodiment, serving to select and determine an optimum bit allocation pattern for transform coefficients of each block. The pattern selection section 25 of the present embodiment is to select a bit allocation pattern which satisfies a condition that the quantization distortion is minimized. The processing carried out by the pattern selection section 25 is described below referring to the flow chart shown in FIG. 21.

The pattern selection section 25 initializes "i" to 1 (step S91), and then determines a class to which the ith block belongs, substituting it into "k" (step S92). After initializing the pattern number v to 1 (step S93), the pattern selection section 25 calculates quantization distortion d(v) caused by the vth pattern (step S94). One is added to "v" (step S95), and thereafter it is decided whether or not v is V(k) or less (v≦v(k)) (step S96), where if the result is Yes, the processing returns to step S94, and the steps S94 to S96 are repeated until the v exceeds V(k).

When the v exceeds V(k), the pattern selection section 25 goes to step S97, where it determines a "v" that minimizes d(v), i.e. $v_{min}(i)$. Then, after adding one to "i" (step S98), it is decided whether or not "i" is less than "I" or less (i≦I) (step S99), where if the result is Yes, the processing returns to step S92, steps S92 to S99 are repeated till i>I. As a consequence, an optimum bit allocation pattern number $v_{min}(i)$ is determined for each block.

At the above step S94, the quantization distortion d(v) can be determined by actually performing quantization and calculating the sum of square quantization errors. That is, taking the square of the quantization error of each transform coefficient as e(v, m), d(v) can be calculated by the following formula:

$$d(v) = \sum_{m=1}^{M} e(v,m) \quad (33)$$

Also, instead of actually calculating the square of a quantization error, d(v) can be determined in an approximation manner. The processing by the pattern selection section 25 in such a case is described below with reference to the flow chart shown in FIG. 22. It is assumed here that the ith block belonging to the kth class is quantized with the vth bit allocation pattern. The pattern selection section 25 first initializes "m" to 1 and d(v) to 0 (step S101), and then gives bit=b(k, v, m), where "m" is a transform coefficient number (step S102).

Figure 23:
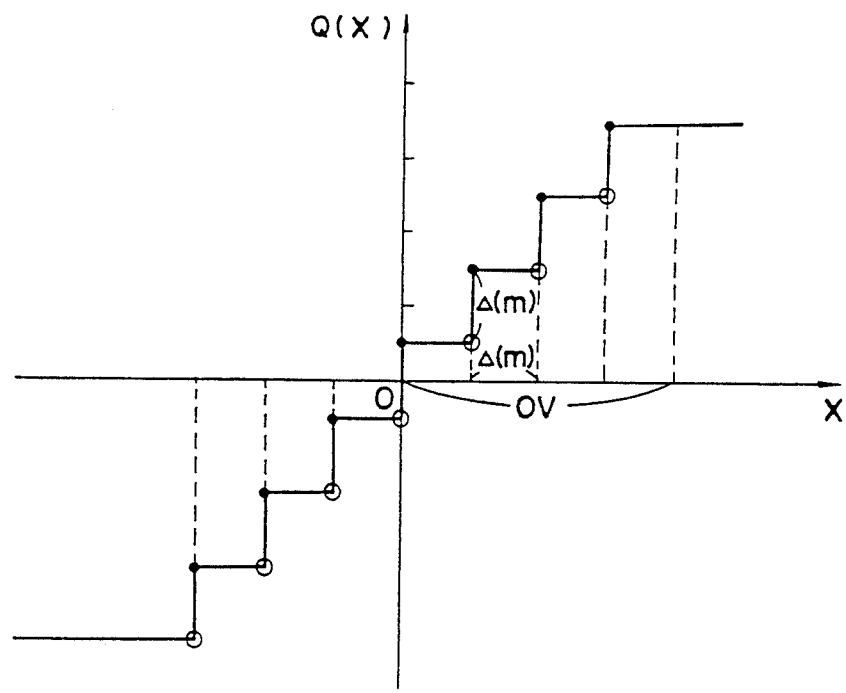
FIG. 23 is a characteristic chart of a quantizer of the high-efficiency coding system in FIG. 19.

Next, at step S103, a value ov, representing an input range that will not cause any overload distortion in quantization, is calculated by the following formula:

$$ov = \Delta(m) \times 2^{bit-1} \quad (34)$$

where a quantizer used here is assumed to have such a characteristic as shown in FIG. 23. In the figure, x denotes an input to the quantizer and Q(x) denotes an output therefrom. Also, Δ(m) in formula (34) is a quantization step size for quantizing the mth transform coefficient, which should be previously given or determined by calculating the variance for each picture.

The pattern selection section 25 subsequently compares the magnitude F(m, i) of a transform coefficient and ov (step S104), where if "or" is smaller, the processing goes to step S105, while if not, it goes to step S106. At step S105, the square overload distortion $(F(m,i)-ov)^2$ is calculated, and added to d(v). Then one is added to "m" (step S106), where it is decided whether or not "m" is M or less $(m \leq M)$ (step S107). If the result is Yes, the processing returns to step S102, and steps S102 to S107 are repeated till m exceeds M $(m > M)$.

It should be noted that although the quantizer used in the this processing is a mid-rize type one having such a characteristic as shown in FIG. 23, yet a mid-tread type quantizer will do for the same processing. Moreover, instead of using formula (33) in which quantization distortions due to each transform coefficient are added up using the same weight, the following formula in which human visual characteristics have been taken into consideration will also do for calculating d(v):

$$d(v) = \sum_{m=1}^{M} w(m) * e(v, m)$$

where w(m) is a weight representing the importance of each transform coefficient with respect to vision, being determined by visual experiments.

Through the steps as described above, the processing in which the optimum bit allocation patterns for quantization of the transform coefficients of the blocks are selected is completed.

In FIG. 19, a quantization section 26 has such a characteristic as shown in FIG. 23, serving to quantize each transform coefficient with the number of bits according to the bit allocation pattern selected by the pattern selection section 25. An encoding section 27 performs error correction to the transform coefficients quantized by the quantization section 26 before yielding the output of final encoded data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image coding system, comprising:
   means for dividing one-screen image data of an original image into a plurality of blocks;
   a transform means for determining transform coefficients for each block of the image data by performing an orthogonal transform to each of the divided image data;
   a first bit-allocation means for allocating bits to the blocks depending on statistical values of the transform coefficients of respective ones of the blocks so that an amount of information for each of regions of a regular size is made constant;
   a second bit-allocation means for allocating bits to the transform coefficients of each block so that the number of bits falls within a range of the number of bits having been allocated to the corresponding block;
   a quantization means for quantizing each of the transform coefficients by a quantization step depending on the number of bits assigned thereto to prepare quantization indices;
   an encoding means for encoding the quantization indices and transmitting the encoded quantization indices as codes along with additional information at a constant bit rate;
   a decoding means for decoding the codes received from the encoding means via a transmission medium to restore the quantization indices;
   a third bit-allocation means for determining the number of the bits allocated to each transform coefficient based on the corresponding restored quantization indices and the additional information;
   an inverse quantization means for inversely quantizing the quantization indices of each block depending on the decoded quantization indices, the additional information, and the number of bits assigned to the corresponding one of the blocks so as to restore the transform coefficients of each block;
   an inverse transform means for performing an inverse orthogonal transform to the restored transform coefficients of each block to thereby restore the picture data for each block; and
   means for reconstructing an image by combining the restored image data of the blocks.

2. An image coding system, comprising:
   means for dividing one-screen image data of an original image into a plurality of blocks;
   a transform means for determining transform coefficients for each block of the image data by performing an orthogonal transform to each of the divided image data;
   a first bit-allocation means for allocating bits to the blocks depending on statistical values of the transform coefficients of respective ones of the blocks so that an amount of information for each of regions of a regular size is made constant;
   a second bit-allocation means for allocating bits to the transform coefficients of each block substantially in accordance with a function f(i) which allocates bits without limiting b(i) to an integer and which corresponds essentially to $$A + \ln \sigma(i)^2 / a$$

where $\sigma(i)^2$ is variance of the ith transform coefficient and a is a specified set value, a bit allocation directed to the ith transform coefficient being expressed as b(i) (i=0, 1, ..., N−1), where N represents the number of transform coefficients, said bit-allocation means including means for providing a quantizing function Q(f(i)) which uniformly quantizes f(i) as a function of A and which provides a correspondingly quantized value for $$\sum_{i=0}^{N-1} b(i)$$

as a function of A;
   said bit allocation means also including means for determining a value for A such that $$\sum_{i=0}^{N-1} b(i) = B$$

where B is a desired total number of bits for encoding said block and then determining b(i) by the following equation $$b(i) = Q(f(i)) = Q(A + (\ln \sigma(i)^2)/a);$$

a quantization means for quantizing each of the transform coefficients by a quantization step depending on the number of bits assigned thereto to prepare quantization indices;

an encoding means for encoding the quantization indices and transmitting the encoded quantization indices as codes along with additional information at a constant bit rate;

a decoding means for decoding the codes received from the encoding means via a transmission medium to restore the quantization indices;

a third bit-allocation means for determining the number of the bits allocated to each transform coefficient based on the corresponding restored quantization indices and the additional information;

an inverse quantization means for inversely quantizing the quantization indices of each block depending on the decoded quantization indices, the additional information, and the number of bits assigned to the corresponding one of the blocks so as to restore the transform coefficients of each block;

an inverse transform means for performing an inverse orthogonal transform to the restored transform coefficients of each block to thereby restore the images data for each block; and means for reconstructing an image by combining the restored image data of the blocks.

* * * * *